United States Patent [19]

Okada et al.

[11] Patent Number: 5,003,493

[45] Date of Patent: Mar. 26, 1991

[54] IMAGE FORMING APPARATUS

[75] Inventors: Tadashi Okada; Junichi Kajiwara; Toshihisa Matsuo; Atsushi Narukawa; Masashi Toyoda; Yoshikado Yamada; Yoshiteru Mori, all of Nara; Yoshiyuki Noda, Kyoto; Hideo Taniguchi; Katsutoshi Ishikawa, both of Nara, all of Japan

[73] Assignee: Sharp Kabushiki Kaisha, Osaka, Japan

[21] Appl. No.: 431,625

[22] Filed: Nov. 3, 1989

[30] Foreign Application Priority Data

| | | | |
|---|---|---|---|
| Nov. 9, 1988 | [JP] | Japan | 63-284291 |
| May 15, 1989 | [JP] | Japan | 1-121807 |
| May 16, 1989 | [JP] | Japan | 1-122492 |
| May 16, 1989 | [JP] | Japan | 1-122493 |

[51] Int. Cl.$^5$ .......... G06K 15/00

[52] U.S. Cl. .......... 364/519; 271/162; 355/311

[58] Field of Search .......... 355/311, 313, 314, 321, 355/243, 308; 364/519, 520; 271/162; 400/622

[56] References Cited

U.S. PATENT DOCUMENTS

| | | | |
|---|---|---|---|
| 3,847,387 | 11/1974 | Sick | 271/171 |
| 4,618,252 | 10/1986 | Hisajima et al. | 355/243 |
| 4,634,266 | 1/1987 | Migita et al. | 355/243 |
| 4,647,189 | 3/1987 | Fujiwara et al. | 355/243 |

FOREIGN PATENT DOCUMENTS

| | | | |
|---|---|---|---|
| 2715948 | 10/1978 | European Pat. Off. | |
| 0264958 | 4/1988 | European Pat. Off. | |
| 56-9251 | 5/1981 | Japan | 364/519 |
| 56-59245 | 5/1981 | Japan | 364/519 |
| 59-123859 | 7/1984 | Japan | 364/519 |

*Primary Examiner*—Arthur G. Evans
*Attorney, Agent, or Firm*—Flehr, Hohbach, Test, Albritton & Herbert

[57] ABSTRACT

An image forming apparatus comprising rotatable cassettes rotated by cassette rotating means between a longitudinal feeding station from which paper is fed in a longitudinal direction thereof and a lateral feeding station from which paper is fed in a lateral direction thereof, wherein memory means stores a cassette rotation signal, when the cassette rotation signal is entered therein and cassette rotating means is controlled in accordance with the cassette rotation signal stored in the memory means when a cassette rotation permission signal for permitting the rotation of the rotatable cassette is generated, so that the rotatable cassette is set in a predetermined feeding station.

The invention also provides an image forming apparatus capable of storing the feeding station of the rotatable cassette in the memory means and rotating the rotatable cassette to the feeding station stored in the memory means when the rotatable cassette is out of both longitudinal feeding station and lateral feeding station. Further, the invention provides an imagae forming apparatus capable of selecting a desired cassette from a plurality of cassettes and instructing to rotate the rotatable cassette by depressing a minimum number of operation keys. The invention further provides an image forming apparatus wherein the rotatable cassette is taken out therefrom by setting the rotatable cassette in either of the longitudinal feeding station and the lateral feeding station, characterized in that the rotatable cassette is set in the feeding station specified as a rotatable cassette taking-out/insertion position each time an image formation is completed.

34 Claims, 17 Drawing Sheets

IMAGE FORMING APPARATUS

FIELD OF THE INVENTION

The present invention relates to image forming apparatus such as copying machines and laser printers, and particularly to image forming apparatus having rotatable cassettes rotated between a longitudinal feeding station from which paper is fed in a longitudinal direction thereof and a lateral feeding station from which paper is fed in a lateral direction thereof.

BACKGROUND OF THE INVENTION

Image forming apparatus such as coppying machines generally have a plurality of paper feed cassettes, that is, a paper feed cassette for every size of copy paper to be used. When feeding paper using such a paper feed cassette, it is preferable, in consideration for feeding speed, to feed paper laterally oriented (hereinafter referred to as "lateral feeding") rather than paper longitudinally oriented (hereinafter referred to as "longitudinal feeding"), with respect to the feeding direction. In some conventional copying machines, large size papers such as B4 size paper and A3 size paper are fed laterally for the above reason.

The lateral feeding of large size paper, however, brings about such a drawback that the sizes of parts disposed in a copying machine such as a photoreceptor drum, delivery roller, delivery path for paper are enlarged, increasing the production cost. Therefore, such a method is adapted in standard type copying machines that large size papers such as B4 size and A3 size papers are longitudinally fed while A4 size paper and smaller ones are laterally fed. When using a copying machine with a variable magnification function for performing reduced and enlarged copying operations, paper feed cassettes of B5R size and A4R sized used for longitudinal feeding are needed in order to perform image reduction, and paper feed cassettes of B5 size and A4 size used for lateral feeding are also needed when taking the feeding speed into consideration (the cassettes such as A4R and B5R are used for "longitudinal feeding " and the cassettes such as A4 and B5 are for "lateral feeding"). It is, however, required for using various types of paper feed cassettes to enlarge the size of a copying machine or replace one cassette with another according to purposes when copying. As a result, the parts of the copying machine become large, increasing the production cost in the former case, and the operation becomes more complicated and troublesome in the latter.

An image forming apparatus designed to solve the above problems is disclosed in Japanese Publication for Unexamined Patent Application Nos. 59245/1981 and 123859/1984, in which one cassette is used for both longitudinal feeding and lateral feeding by rotating the cassette. More specifically, a B5 size cassette is used as a B5 size cassette, and an A4 size cassette is used as an A4R size cassette.

In the above apparatus, the rotatable cassettes are rotated in response to the actuation of a cassette rotation key for executing the rotation of a rotatable cassette. Since such rotatable cassettes are required to be mounted on a rotation mechanism, the cassette is generally housed in the main body of an image forming apparatus.

With the use of the image forming apparatus having rotatable cassettes, whenever an operator depresses the cassette rotation key by mistake, the rotatable cassette is rotated. Therefore, the rotatable cassette is loaded with useless rotation and noise is produced at the time when the cassette is rotated. This not only breaks the silence in the surroundings but also reduces service life of the rotation mechanism.

Further, if the cassette rotation key is depressed during paper feeding from the rotatable cassette, a paper jamming often occurs. In case a paper jamming occurs, the rotatable cassette is rotated to return to an initial feeding station, and copying operation is peformed again to compensate for the deficient copies caused by the paper jamming. Thereafter, the cassette rotation key is depressed again in order to set the rotatable cassette in a desired feeding station. In this case, the rotatable cassette is forced to uselessly rotate like the foregoing case, causing the generation of noise and the deterioration of the durability of the rotation mechanism.

The above image forming apparatus is designed such that either one of the longitudinal feeding station and the lateral feeding station is set as a "preferential feeding station". When the power switch is turned on, or the rotatable cassette is inserted in the apparatus after supplying paper, if the rotatable cassette is out of the proper longitudinal feeding station or lateral feeding station, the rotatable cassette is rotated to be positioned in the preferential feeding station.

If paper is run out in the course of paper feeding from the rotatable cassette, and the rotatable cassette gets out of a predetermined feeding station when the rotatable cassette is inserted in the image forming apparatus after being taken out therefrom for paper supply, the rotatable cassette is rotated to be set in the preferential feeding station. If the originally set feeding station differs from the preferential feeding station, another operation for resetting the rotatable cassette in the originally set feeding station becomes necessary. This results in such a drawback that the efficiency in the operation is deteriorated.

The above image forming apparatus having (a) a plurality of rotatable cassettes, or (b) at least one rotatable cassette and one or more fixed cassettes is provided with a cassette selection key for selecting a cassette and cassette rotation keys for rotating a rotatable cassette. This increases the number of operation keys disposed on the operation panel and makes the key operation more troublesome.

Furthermore, in the case the width of the opening from which the rotatable cassette is taken out and inserted is limited, the rotatable cassette is required to be set in either of the feeding stations when being taken out or inserted. Therefore, if the rotatable cassette is positioned in a feeding station different from the station from which cassette insertion/taking out is only possible when copy paper is run out, the cassette is required to be reset. This makes the paper supply to the rotatable cassette more troublesome.

SUMMARY OF THE INVENTION

It is one of the objects of the present invention to provide an image forming apparatus wherein even if an error is made in operating cassette rotation instructing means such as a cassette rotation key, the error is corrected thereby preventing the rotatable cassette from being forced to a useless rotation.

It is another object of the present invention to provide an image forming apparatus wherein even if an instruction to rotate the rotatable cassette is issued by mistake in the course of image formation of paper feeding from the rotatable cassette, the rotation of the rotatable cassette is suspended thereby preventing the occurrence of a paper jamming in order to avoid a useless rotation to be imposed on the rotatable cassette.

It is still another object of the present invention to provide an image forming apparatus wherein even if the rotatable cassette gets out of both longitudinal and lateral feeding stations, the image forming operation can be smoothly continued wihtout a special operation carried out by the operator.

It is yet another object of the present invention to provide an image forming apparatus wherein the number of cassette change instructing means required for changing cassettes and instructing the rotation of the rotatable cassettes is minimized and the rotatable cassette is prevented from uselessly rotating until cassette selection and the setting of the feeding station of the rotatable cassette are completed.

It is a further object of the present invention to provide an image forming apparatus arranged such that either one of the longitudinal and lateral feeding stations is specified as a position in and from which the rotatable cassette is inserted or taken out, wherein the rotatable cassette can be immediately inserted or taken out without setting the rotatable cassette in the above specified feeding station which is carried out by the operator.

In order to achieve the foregoing objects, the image forming apparatus of the present invention having rotatable cassettes rotated by cassette rotating means between a longitudinal feeding station from which paper is fed in a longitiudinal direction thereof and a lateral feeding station from which paper is fed in a lateral direction thereof, is characterized by: (a) memory means for storing a cassette rotation signal for instructing to rotate the rotatable cassette; (b) control means for permitting the memory means to store the cassette rotation signal when the cassette rotation signal is entered therein and for controlling the cassette rotating means in accordance with the cassette rotation signal stored in the memory means: when a cassette rotation permission signal for permitting the rotation of the rotatable cassette is generated, so that the rotatable cassette is set in a predetermined feeding station.

In the above image forming apparatus, the rotatable cassette is not rotated immediately after an instruction to rotate the rotatable cassette is issued, but rotated only when the cassette rotation permission signal for permitting th rotation of the rotatable signal is generated after the cassette rotation signal is once stored in the memory means. Therefore, should the operator instruct to rotate the rotatable cassette by mistake, the erroneous instruction would be cancelled before the generation of the cassette rotation permission signal, thereby preventing the useless rotation of the rotatable cassette.

The above cassette rotation permission signal is generated, for instance, when image formation start instructing means is operated. In this case, the rotatable cassette is not rotated immediately after an instruction to rotate the rotatable cassette is issued but rotated only when an instruction to start image formation is issued by the image formation start instructing means.

The above cassette rotation permission signal may be generated when the cassette rotation signal is not altered until a predetermined period elapses after a cassette rotation signal for instructing to rotate the rotatable cassette is issued.

In such an arrangement, even if the operator instructs to rotate the rotatable cassette by mistake, the erroneous instruction is cancelled or corrected during the predetermined period, thereby preventing the useless rotation of the rotatable cassette.

Also, the generation of the cassette rotation permission signal may be deferred until the completion of the image formation, in the case an instruiction to rotate the rotatable cassette issued after such image formation is initiated. In this case, should the operator instruct to rotate the rotatable cassette during the image formation, the rotation is temporarily suspended and the rotation of the rotatable cassette is not started until the completion of the image formation is detected. Therefore, a paper jamming caused by the rotation of the rotatable cassette in the course of image formation is avoided, thereby preventing the rotatable cassette from rotating back to an initial feeding station in order to perform image formation again to compensate for the deficient copies caused by the paper jamming.

The generation of the cassette rotation permission signal may be deferred until the completion of the paper feeding from the rotatable cassette in the case an instruction to rotate the rotatable cassette is issued in the course of such paper feeding.

With this arrangement, a paper jamming is avoided, which is caused by the rotation of the rotatable cassette during the paper feeding from the rotatable cassette, thereby preventing the rotatable cassette from rotating back to an initial feeding station in order to perform image formation again to compensate for the deficient copies caused by the paper jamming. This reduces the number of useless rotations of the rotatable cassette.

Another image forming apparatus according to the present invention having rotatable cassettes rotated by cassette rotating means between a longitudinal feeding station from which paper is fed in a longitudinal direction thereof and a lateral feeding station from which paper is fed in a lateral direction thereof, is characterized by: (a) feeding station detecting means for detecting whether the rotatable cassette is positioned in the longitudinal feeding station or the lateral feeding station; and (b) control means for controlling the cassette rotating means so as to rotate the rotatable cassette to a predetermined feeding station when a cassette rotation signal for instructing to rotate the rotatable cassette is generated, permitting memory means to store the predetermined feeding station to which the rotatable cassette has been rotated, and controlling the cassette rotating means if the feeding station detecting means detects that the rotatable cassette gets out of the predetermined feeding station when the cassette rotation signal is not generated so that the rotatable cassette is reset in the feeding station stored in the memory means.

In the above arrangement, even if the rotatable cassette gets out of both longitudinal and lateral feeding stations after supplying paper to the rotatable cassette for example and therefore normal paper feeding cannot be performed, the rotatable cassette is automatically rotated, without instructing operation by the operator, to a feeding station which has been the most lately set and stored in the memory means, whereby image formation can be smoothly continued.

Still another image forming apparatus according to the present invention having (a) a plurlity of cassettes including rotatable cassettes rotated by cassette rotating means between a longitudinal feeding station from which paper is fed in a longitudinal direction thereof and a lateral feeding station from which paper is fed in a lateral direction thereof; (b) image formation start instructing means for instructing to start image formation; (c) cassette display means for displaying a selected cassette; and (d) paper display means for displaying the size and feeding direction of paper stored in the selected cassette, and indicating the longitudinal feeding and lateral feeding as to paper stored in the rotatable cassettes, is characterized by: (1) cassette changeover instructing means for instructing to change the cassette; (2) memory means for storing the feeding direction of paper indicated by the paper display means; (3) feeding station detecting means for detecting whether the rotatable cassette is set in the longitudinal feeding station or the lateral feeding station; (4) control means for successively switching the cassette display means and paper display means which correspond to each cassette when the cassette changeover instructing means is operated, permitting the memory means to store the feeding direction of the paper displayed by the paper display means which has been selected by the above changeover operation, and controlling the cassette rotating means such that the feeding station corresponding to the paper feeding direction stored in the memory means when a rotatable cassette is selected by the cassette changeover instructing means and the image formation start instructing means is operated, is made coincident with the feeding station in which the rotatable cassette is positioned detected by the feeding station detecting means, when those feeding stations are different from each other.

With the above arrangement, since the same cassette changeover instructing means is used for selecting a cassette as well as instructing to rotate the rotatable cassette, the number of parts can be reduced. The rotatable cassette is rotated only when the image formation start display means is operated, that is, the rotatable cassette is not rotated until cassette selection or instructin to rotate the rotatable cassette is confirmed. Therefore, the useless rotation of the rotatable cassette can be prevented.

Still another image forming apparatus according to the present invention having rotatable cassettes rotated by cassette rotating means between a longitudinal feeding station from which paper is fed in a longitudinal direction thereof and a lateral feeding station from which paper is fed in a lateral direction thereof, said rotatable cassette being inserted or taken out in and from the image forming apparatus when it is positioned in a predetermined feeding station, is characterized by: (a) feeding station detecting means for detecting whether the rotatable cassette is positioned in the longitudinal feeding station or in the lateral feeding station when the power switch of the image forming apparatus is turned on and/or an image formation is completed; (b) control means for permitting the cassette rotating means to rotate the rotatable cassette to the feeding station predetermined as a cassette taking-out/insertion position when the feeding station where the rotatable cassette is positioned detected by the feeding station detecting means is different from the predetermined feeding station.

In the above arrangement, the rotatable cassette is set in a feeding station predetermined as a cassette taking-out/insertion position each time the power switch of the image forming apparatus is turned on and/or one image formation is completed, so that the rotatable cassette is always positioned in the predetermined feeding station from which the rotatable cassette can be taken out whenever the rotatable cassette is required to be taken out, for example, in order to supply paper thereto.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a flow chart showing the control operation of a microcomputer.

FIG. 2 is a diagram showing the whole structure of a copying machine.

FIG. 3 is a perspective view showing a part of the copying machine shown in FIG. 2 wherein a second rotatable cassette unit is drawn out.

FIG. 4(*a*) is a partly diagrammatic sectional perspective illustration showing the structure of a first and the second rotatable cassette units shown in FIG. 2.

FIG. 4(*b*) is an enlarged perspective view showing a nut shown in FIG. 4(*a*) and the periphery thereof.

FIG. 5 is a perspective view showing the main part of a cassette mounting unit provided in a main body and a desk of the copying machine and a projecting member provided in each fixed cassette.

FIG. 6(*a*) is a front view of an operation panel.

FIG. 6(*b*) is a front view of a cassette operation unit of the operation panel.

FIG. 7 is a block diagram showing the structure of a control unit.

FIG. 8 is an explanatory diagram showing the rotating process of a rotatable cassette.

FIG. 13 is a front view of a cassette operation unit of the operation panel.

FIG. 14 is a flow chart of the control operation of a microcomputer.

FIG. 15 is a main portion plan view of a copying machine.

FIG. 16 is a main portion front view of the copying machine.

FIG. 17 is a flow chart of a control operation.

DESCRIPTION OF THE EMBODIMENTS

The following description describes one embodiment of the present invention with reference to FIGS. 1 to 8.

Figure 2:
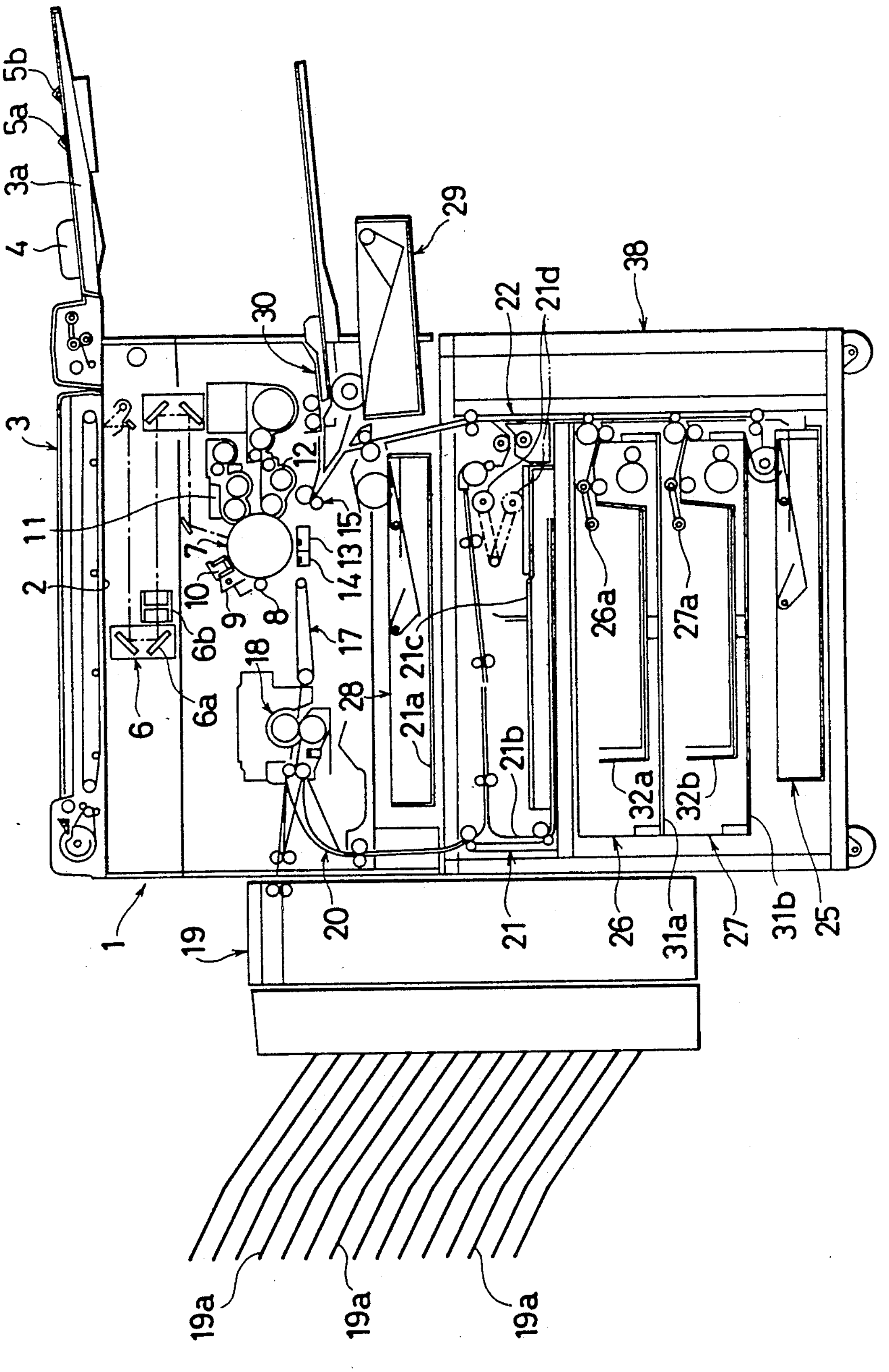
Figure 3:
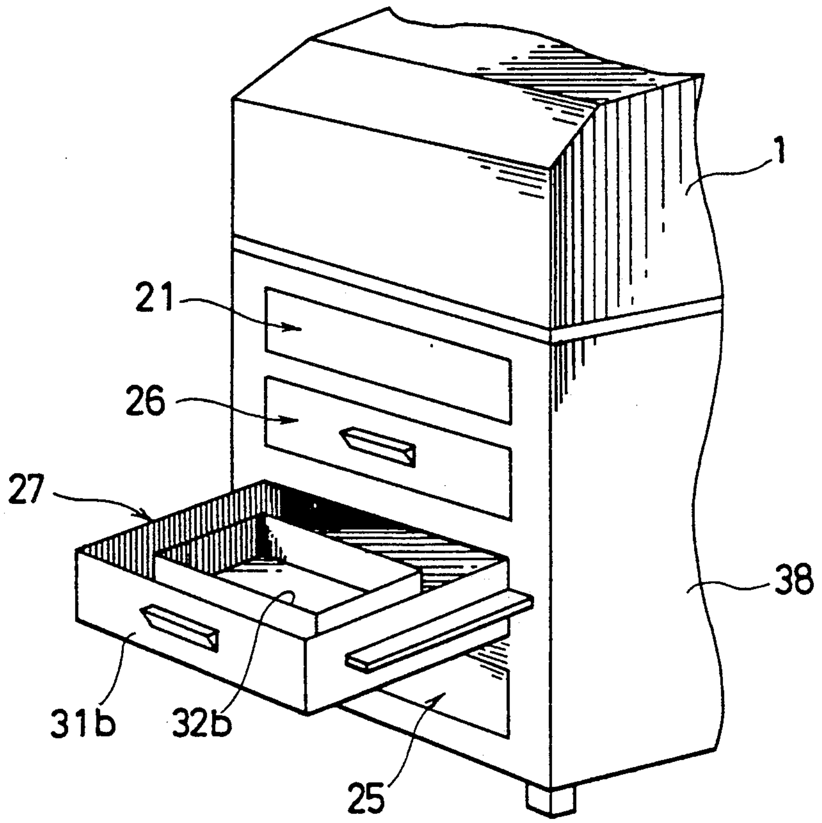

A copying machine known as an image forming apparatus comprises, as shown in FIG. 2, a main body 1, a desk 38 on which the main body is placed, a sorter 19 positioned in the paper discharging side of the main body 1 and an automatic document feeder 3 (hereinafter referred to as ADF). As shown in FIG. 3, provided for the desk 38 are, in a descending scale, a both side combining unit 21, a first rotatable cassette unit 26, a second rotatable cassette unit 27 and a third fixed cassette 25. The first rotatable cassette unit 26 comprises a rotatable cassette 32*a* disposed in an outer box 31*a* and the second rotatable cassette unit 27 comprises a rotatable cassette 32*b* disposed in an outer box 31*b*.

The ADF 3 is installed on an original glass plate 2 of the main body 1 and capable of conveying a document (not shown) placed on the document placing tray 3*a* toward a predetermined position at the original glass plate 2 in accordance with the size of the document and a selected feeding direction (i.e. longitudinal feeding direction or lateral feeding direction), and discharging the document outward after the completion of the copying operation. When executing so-called duplex copying, the ADF 3 reverses a document one side of which has been copied and conveys it to a predetermined position at the original glass plate 2, and discharges the document outward after the duplex copying is completed.

The document placing tray 3*a* comprises thereon conveying direction switches 5*a* and 5*b* for detecting the conveying direction of a document, and a guide 4 for guiding the document not so as to be shifted in a direction perpendicular to the conveying direction. The guide 4 includes a document size detection switch (not shown) for detecting the length of a document which is perpendicular to the conveying direction. The conveying direction switches 5*a* and 5*b* and the document size detection switch constitute a document size detection unit 54 (to be discussed later).

Under the original glass plate 2 is disposed an optical system 6 having a basic function of guiding reflected light from the document into a photoreceptor drum 7, which is designed in order to perform variable magnification copying such as image reduction and image enlargement in addition to same size copying, the optical system 6 comprising a plurality of reflecting mirrors 6*a* and a lens 6*b*.

Disposed around the photoreceptor drum 7 are a cleaner 8, a static eliminating charger 9, a main charger 10, a developing device 11 having toner for color copying, and a developing device 12 having toner for black-and-white copying. Disposed under the photoreceptor drum 7 are a transferring charger 13 and a separating charger 14. Disposed behind the separating charger 14 are a conveyor belt 17 and a fixing device 18.

In same size copying, paper from the fixing device 18 is discharged to copy receiving trays 19*a* by way of the sorter 19. In duplex copying, paper guided from a paper returning path 20 to the both side combining unit 21 is guided to a paper feeding path 22 by way of a first feeding path 21*a*, an intermediate tray 21*c* and a delivery roller 21*d* within the both side combining unit 21. In complex copying, paper guided from a paper returning path 20 to the both side combining unit 21 is guided to the paper feeding path 22 by way of a second feeding path 21*b*, the first feeding path 21*a*, the intermediate tray 21*c* and the delivery roller 21*d* within the both side combining unit 21. The end portion of the paper feeding path 22 reaches a paper stopping roller 15 in the neighborhood of the photoreceptor drum 7.

Paper is properly fed to the paper feeding path 22 from a plurality of paper feeding means. More concretely, there are provide, in the order of increasing distance to the paper stopping roller 15 disposed in the main body 1, a manual paper feeder 30, a first fixed cassette 29 capable of storing e.g. 500 sheets, a second fixed cassette 28 capable of storing e.g. 250 sheets, the both side combining unit 21, the first rotatable cassette unit 26, the second rotatable cassette unit 27 and a third fixed cassette capable of storing e.g. 250 sheets. The fixed cassettes 29, 28 and 25 and the rotatable cassette units 26 and 27 are all detachable from the copying machine.

Figure 4A:
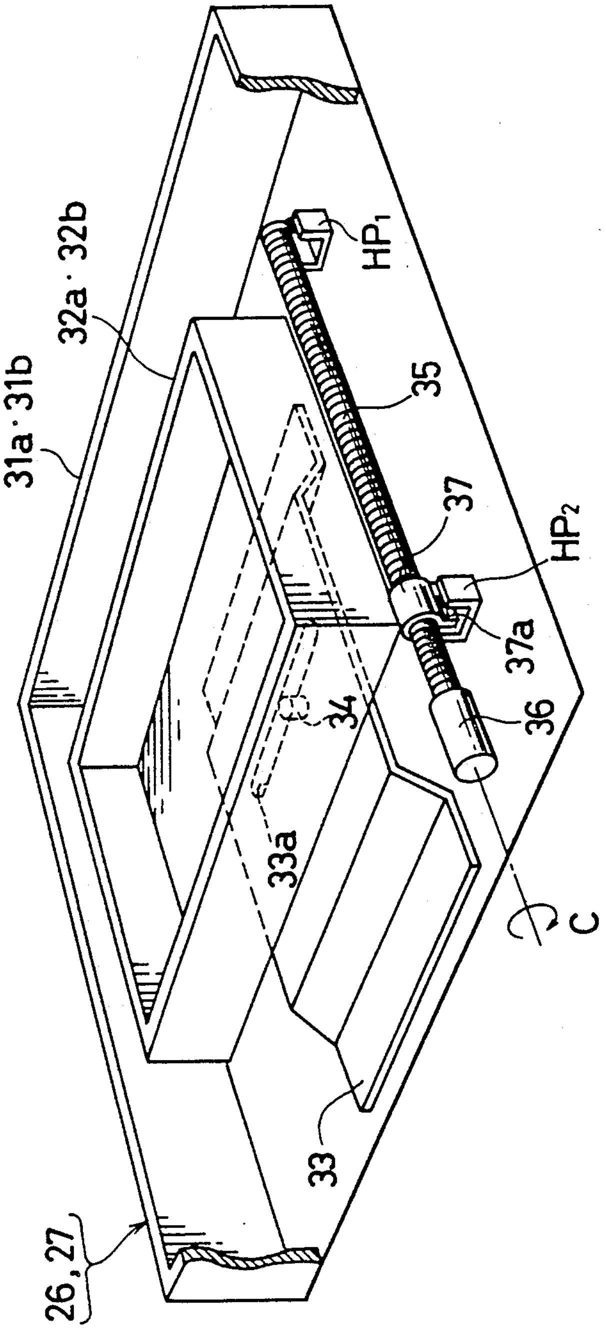
Figure 4B:
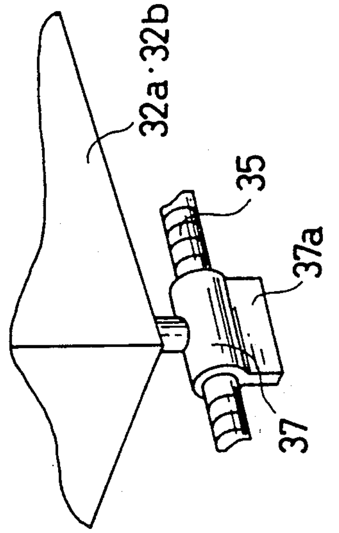

The first rotatable cassette unit 26 comprises, as shown in FIG. 4(*a*), the outer box 31*a* and the rotatable cassette 32*a* disposed within the outer box 31*a*, for storing paper of a predetermined size. The rotatable cassette 32*a* has a rotating plate (not shown) for raising paper stored in the rotatable cassette 32*a* as the number of papers is decreased. The outer box 31*a* has, at the bottom wall, a cassette supporting plate 33 the center portion of which is apart from the bottom wall of the outer box 31*a*. A guiding hole 33*a* in the form of a long circle is disposed at the center portion of the cassette supporting plate 33 such that its longitudinal axis is parallel to a paper feeding direction. At the back face of the rotatable cassette 32*a*, there is provided a guiding shaft 34 positioned in the guiding hole 33*a* so as to project downward.

The outer box 31*a* is provided with a threaded shaft 35 positioned parallel to the bottom wall of the outer box 31*a*, which extends in a direction perpendicular to the paper feeding direction. The threaded shaft 35 is rotatably supported by a bearing (not shown) and coupled with a cassette rotating motor 36 at one end thereof, so as to rotate normally and reversely. The threaded shaft 35 is connected to a nut 37 such that the nut 37 helically reciprocates along the threaded shaft 35 by the normal/reverse rotations of the threaded shaft 35. As shown in FIG. 4(*b*), the upper end of the nut 37 is pivotally connected to one corner of the rotatable cassette 32, and a light interrupting member 37*a* is formed at the lower part of the nut 37.

A sensor $HP_1$ for detecting that the rotatable cassette 32*a* is rotated to the lateral feeding station and a sensor $HP_2$ for detecting that the rotatable cassette 32*a* is rotated to a longitudinal feeding station are respectively formed in the neighbourhood of both ends of the threaded shaft 35 on the bottom wall of the outer box 31*a*. The sensors $HP_1$ and $HP_2$ are photointerrupters each comprising a light emitting element and a light receiving element. When the rotatable cassette 32*a* moves to a predetermined feeding station, (i.e., either of the lateral and longitudinal feeding stations), either of the sensors $HP_1$ and $HP_2$ detects that light from the light emitting element to the light receiving element is interrupted by the light interrupting member 37*a*, thereby detecting the movement of the rotatable cassette 32*a* to the predetermined feeding station. The sensor $HP_1$ is "ON" when the rotatable cassette 32*a* moves to the lateral feeding station and the sensor $HP_2$ is "ON" when the rotatable cassette 32*a* moves to the longitudinal feeding station. The sensors $HP_1$ and $HP_2$ are not limited to a photointerrupter, but may be a magnetic sensor, contact type switch or other similar device. Since the first rotatable cassette unit 26 and the second rotatable cassette unit 27 are of twin structure, the foregoing description made to the former can be also applied to the latter, by replacing the outer box 31*a* and the rotatable cassette 32*a* with the outer box 31*b* and the rotatable cassette 32b. Therefore, the description of the second rotatable cassette unit 27 is omitted.

Figure 5:
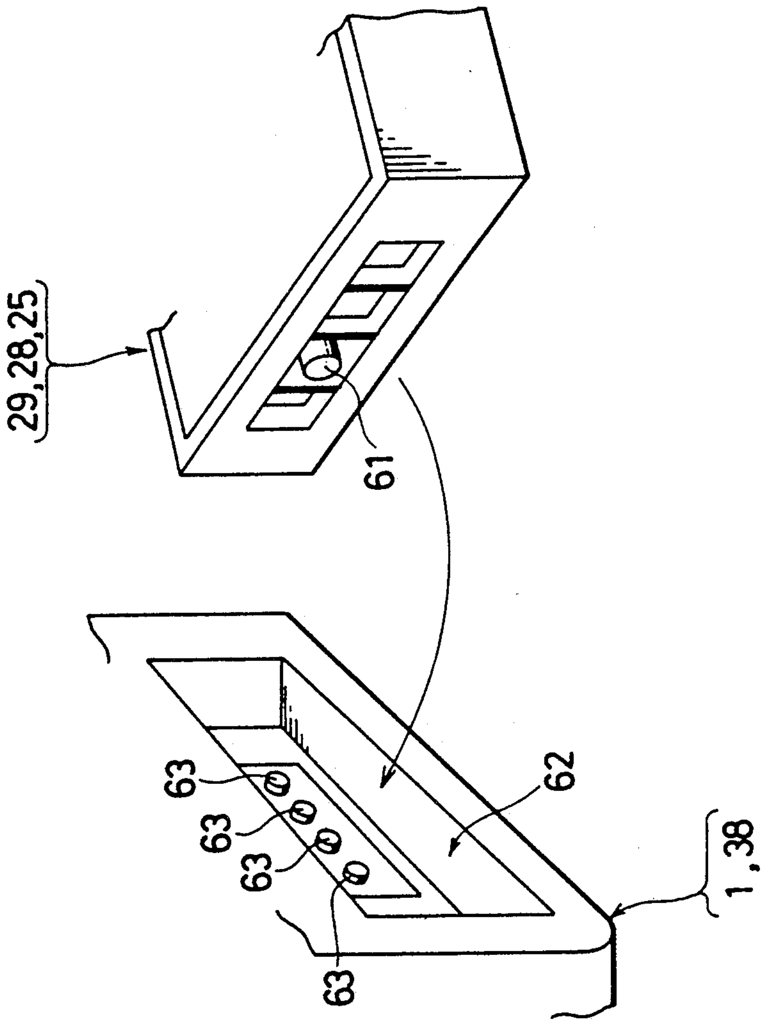

As shown in FIG. 5, the first fixed cassette 29 and the second fixed cassette 28 disposed in the main body 1, and the third fixed cassette 25 disposed in the desk 38 are respectively provided with a projecting member 61. The projecting members 61 are positioned in accordance with the sizes of copy papers stored in the fixed cassettes 29, 28 and 25. At the cassette mounting units 62 in the main body 1 and the desk 38, there are provided a plurality of paper size switches 63 which are turned "ON" by the projecting members 61. For instance, there are four paper size switches 63 corresponding to A3, B4, A4 and B5 sizes respectively. The paper size switches 63 are connected to a microcomputer 51 (to be discussed later). With the above-described arrangement, the microcomputer 51 detects the sizes and feeding directions of papers stored in the fixed cassettes 29, 28 and 25.

On the other hand, the sizes of papers stored in the rotatable cassettes 32a and 32b in the first and second rotatable cassette units 26 and 27 are inputted in the microcomputer 51 by the similar manner to the foregoing or other input means.

Figure 6A:
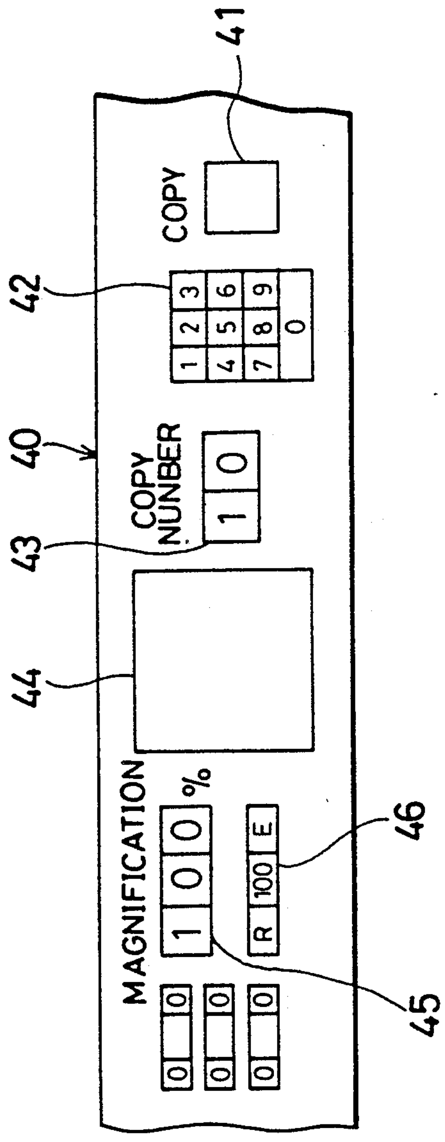

The main body 1 comprises at the upper face thereof an operation panel 40 shown in FIG. 6(a). The operation panel 40 comprises a copy button 41 functioning as image formation start instructing means for instructing to start copying operation (image formation), ten keys 42 comprised of a plurality of numeral keys for setting the number of copies and the like, a copy number display 43, a cassette operation unit 44, a magnification display 45, magnification setting keys 46 and others.

As shown in FIG. 6(b), the cassette operation unit 44 comprises a cassette changeover key 47 for cassette selection, a cassette rotation key 48 for instructing to rotate the rotatable cassette 32a in the first rotatable cassette unit 26 and a cassette rotation key 49 for instructing to rotate the rotatable cassette 32b in the second rotatable cassette unit 27 and others. The cassette operation unit 44 further comprises document size display lamps $DSL_1$ to $DSL_6$; paper size display lamps $PSL_1$ to $PSL_6$; and cassette display lamps $CSL_1$ to $CSL_6$ for indicating the manual paper feeder 30, the first fixed cassette 29, the second fixed cassette 28, the first rotatable cassette unit 26, the second rotatable cassette unit 27 and the third fixed cassette 25 by the numbers "1" to "6" in this order. The cassette display lamps $CSL_1$ to $CSL_6$ are selectively lighted in accordance with the selection of the rotatable cassette units 26 and 27, the fixed cassettes 25, 28 and 29, and the manual paper feeder 30 executed by operating the cassette changeover key 47. More concretely, when the first rotatable cassette unit 26 is selected by operating the cassette changeover key 47, the cassette display lamp $CSL_4$ is lighted. If A4 size paper is stored in the rotatable cassette 32a in the first rotatable cassette unit 26, and the rotatable cassette 32a is in the lateral feeding station, the paper size display lamp $PSL_3$ is lighted, thereby indicating that the selected paper is A4 and the feeding direction is lateral. Thereafter, if the rotatable cassette 32a is rotated from the lateral feeding station to the longitudinal feeding station, the paper size display lamp $PSL_4$ is lighted, thereby indicating that the selected paper is A4 and the feeding direction is longitudinal. In the above case, if there is no paper stored in a selected cassette, the paper size display lamps $PSL_1$ to $PSL_6$ are not lighted.

Figure 7:
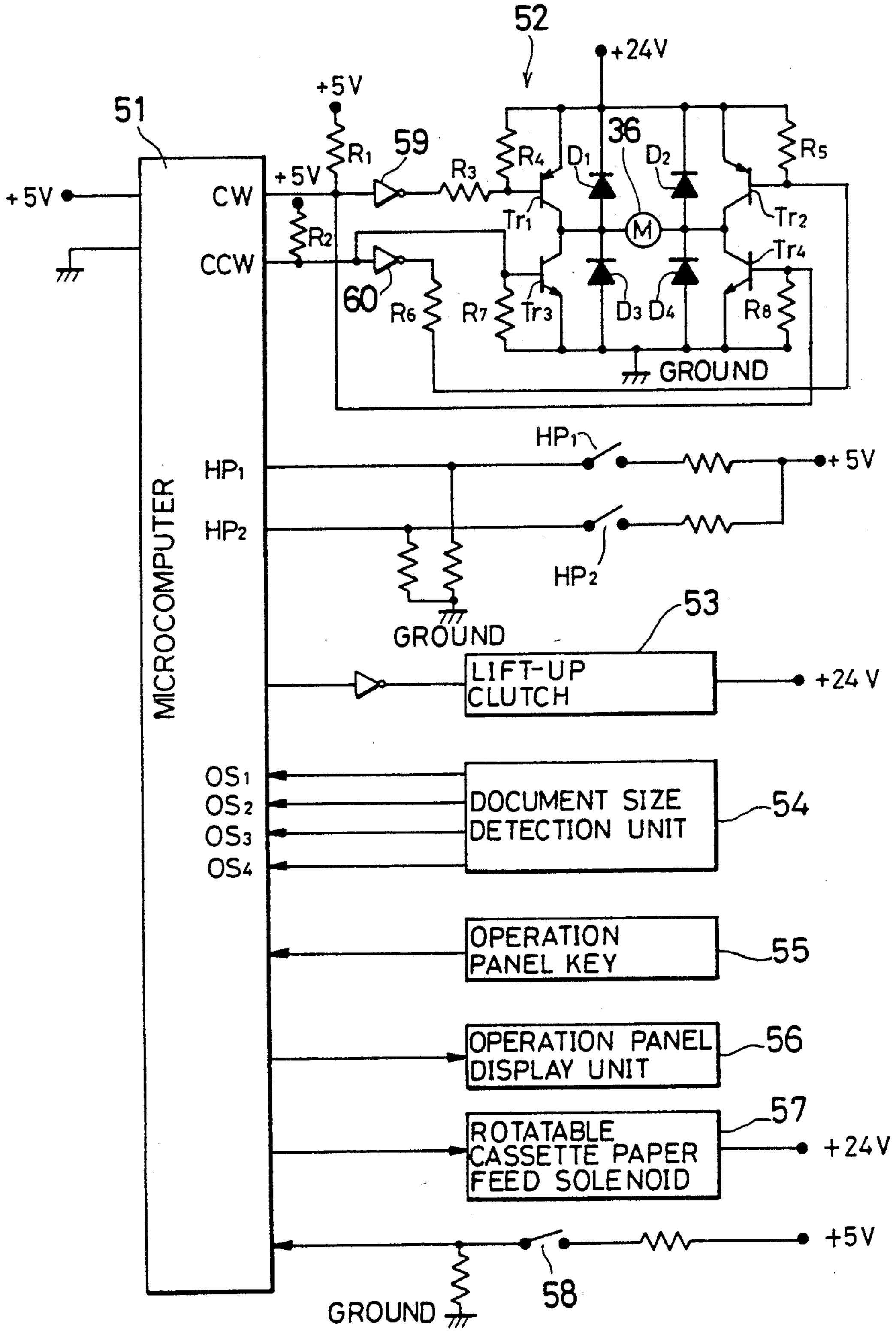

As shown in FIG. 7, the copying machine comprises the microcomputer 51 which functions as control means and memory means. The microcomputer 51 is connected to a motor driver circuit 52 for driving the cassette rotating motor 36 which functions as the cassette rotating means, the sensors $HP_1$, $HP_2$, the paper size switches 63, the document size detection unit 54, operation panel keys 55, operation panel display unit 56, a rotatable cassette paper feed solenoid 57 and a paper discharge detection switch 58 and others.

Although being not shown in FIG. 7, the motor driver circuit 52 and the cassette rotating motor 36 are independently provided for both first and second rotatable cassette units 26 and 27. The motor driver circuit 52 comprises pull-up resistors $R_1$ and $R_2$, NOT circuits 59 and 60, transistors $Tr_1$ to $Tr_4$, resistors $R_3$ to $R_8$ and diodes $D_1$ to $D_4$ which function as surge absorbers, and is arranged to drive the cassette rotating motor 36 so as to rotate normally and reversely in accordance with the output of the microcomputer 51. The pull-up resistor $R_1$ is connected to voltage (+5 V) at one end and an output terminal CW of the microcomputer 51 at the other end. The input of NOT circuit 59 and the base of the transistor $Tr_4$ are respectively connected to the output terminal CW of the microcomputer 51. The output of the NOT circuit 59 is connected to the base of the transistor $Tr_1$ via the resistor $R_3$. The base of the transistor $Tr_1$ is connected to one end of the resistor $R_4$ and the base of the transistor $Tr_2$ is connected to one end of the resistor $R_5$. The other ends of the resistors $R_4$ and $R_5$, the emitters of the transistors of $Tr_1$ and $Tr_2$, the cathodes of the diodes $D_1$ and $D_2$ are all connected to a terminal +24 V, and voltage (+24 V) is applied to the node of the above. The collector of the transistor $Tr_1$ and the anode of the diode $D_1$ are connected to one input terminal of the cassette rotating motor 36, and the collector of the transistor $Tr_2$ and the anode of the diode $D_2$ are connected to the other input terminal of the cassette rotating motor 36. The pull-up resistor $R_2$ is connected to voltage (+5 V) at one end and an output terminal CCW of the microcomputer 51 at the other end. The input of the NOT circuit 60 and the base of the transistor $Tr_3$ are connected to the output terminal CCW of the microcomputer 51 and the output of the NOT circuit 60 is connected to the base of the transistor $Tr_2$ via the resistor $R_6$. The base of the transistor $Tr_3$ is connected to one end of the resistor $R_7$ and the base of the transistor $Tr_4$ is connected to one terminal of the resistor $R_8$. The other ends of the resistors $R_7$ and $R_8$, the emitters of the transistors $Tr_3$ and $Tr_4$, and the anodes of the diodes $D_3$ and $D_4$ are all connected to Ground. The collector of the transistor $Tr_3$ and the cathode of the diode $D_3$ are connected to one input terminal of the cassette rotating motor 36 and the collector of the transistor $Tr_4$ and the cathode of the diode $D_4$ are connected to the other input terminal of the cassette rotating motor 36.

The motor driver circuit 52 is designed such that the rotatable cassette 32a in the first rotatable cassette unit 26 or the rotatable cassette 32b in the second rotatable cassette unit 27 are rotated to the lateral feeding station (e.g. A4 or B5 position) when the output terminal CCW of the microcomputer 51 is at a high level (with the output terminal CW being at a low level), and to the longitudinal feeding station (e.g. A4R or B5R position) when the output terminal CW is at a high level.

The document size detection unit 54 supplys 4-bit data to input terminals $OS_1$ to $OS_4$ of the microcomputer 51.

The operation panel keys 55 include the copy button 41, the ten keys 42, the magnification setting keys 46, the cassette changeover key 47, the cassette rotation keys 48 and 49, and others which are all provided on the operation panel 40 of the main body.

The operation panel display unit 56 includes the copy number display 43, the magnification display 45, the document size display lamps $DSL_1$ to $DSL_6$, the paper size display lamps $PSL_1$ to $PSL_6$, the cassette display lamps $CSL_1$ to $CSL_6$ and others, which are all provided on the operation panel 40.

The rotatable cassette paper feed solenoid 57 is for actuating paper feeding rollers 26*a* and 27*a* respectively disposed in the first and second rotatable cassette units 26 and 27 in order to feed paper.

The paper discharge detection switch 58 (not shown in FIG. 2) is disposed at a paper discharging station led to the sorter 19 and used for detecting paper discharge from the main body 1.

When one of the operation panel keys 55 is depressed, the microcomputer 51 starts its control operation according to the key depressed. For example, when the cassette rotation key 48 corresponding to the first rotatable cassette unit 26 is depressed, thereby entering a cassette rotation signal for instructing to rotate the rotatable cassette 32*a* in the first rotatable cassette unit 26 from the lateral feeding station to the longitudinal feeding station, the level of the output terminal CW becomes high and the level of the output terminal CCW becomes low through the processes of the control operation shown in FIG. 1 (to be described later). On the other hand, if the cassette rotation signal for instructing to rotate the rotatable cassette 32*a* from the longitudinal feeding station to the lateral feeding station is entered, the level of the output terminal CCW becomes high and the level of the output terminal CW becomes low. When the rotatable cassette 32*a* is rotated to the longitudinal feeding station and the sensor $HP_2$ is turned ON (i.e. the light in the photointerrupter of the sensor $HP_2$ is interrupted), the level of the output terminal CW immediately becomes low, thereby halting the cassette rotating motor 36. Likewise, when the rotatable cassette 32*a* is rotated to the lateral feeding station and the sensor $HP_1$ is turned ON, the level of the output terminal CCW immediately becomes low, thereby halting the cassette rotating motor 36.

The following description describes the rotation of the rotatable cassette 32*a* of the first rotatable cassette unit 26 and the rotatable cassette 32*b* of the second rotatable cassette unit 27 in the above arrangement.

Figure 8:
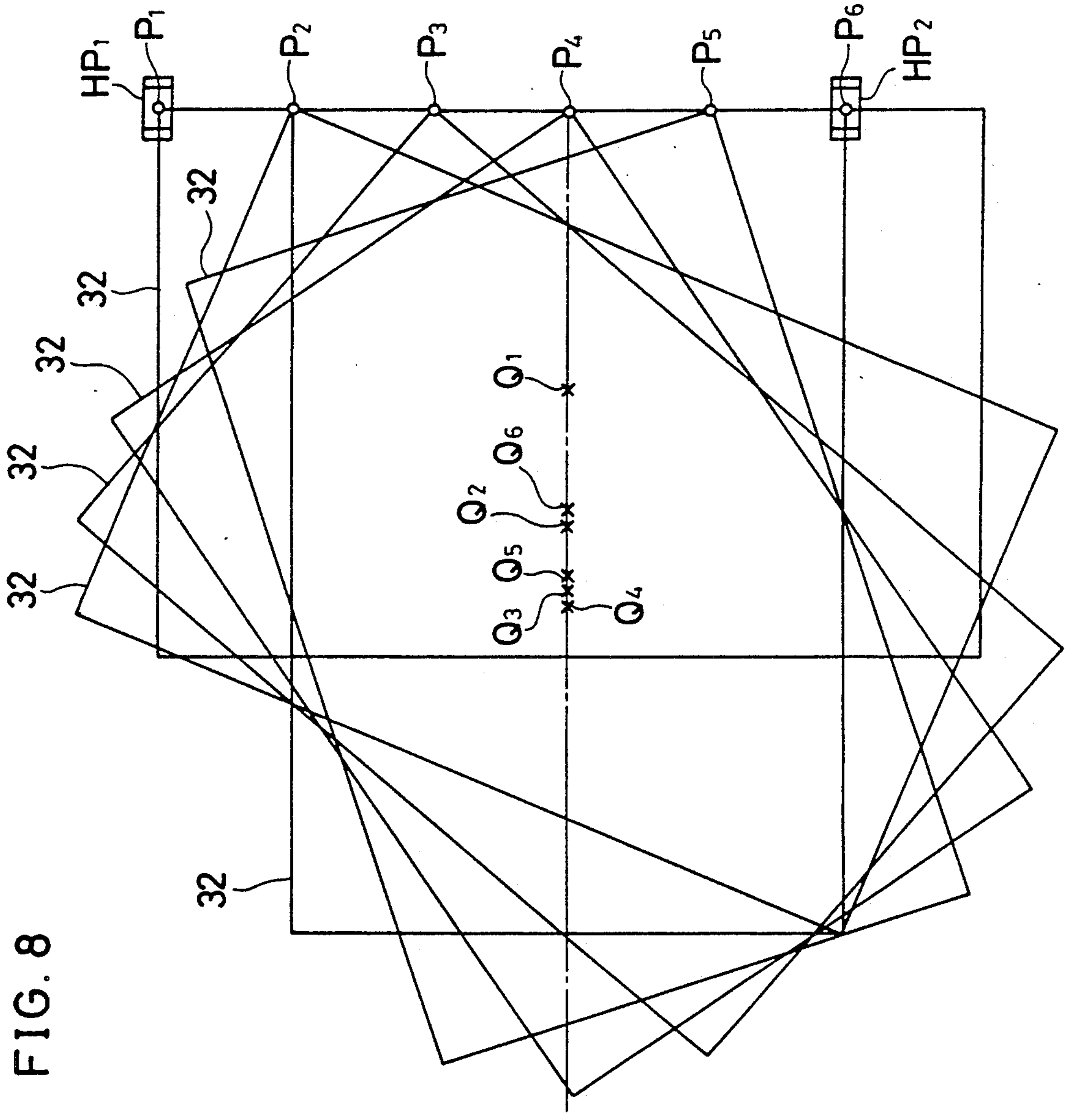

Suppose that A4 size paper is stored in the rotatable cassette 32*a* in the first rotatable cassette unit 26 and the rotatable cassette 32*a* is positioned in the lateral feeding station (i.e. A4 position). The sensor $HP_1$ is turned ON and the display for the first rotatable cassette unit 26 on the operation panel display unit 56 indicates A4. At this time, the nut 37 disposed at the threaded shaft 35 is located at the position $P_1$ as shown in FIG. 8.

When the microcomputer 51 causes the output terminal CW to be high and the ouput terminal CCW to be low, the transistor $Tr_1$ and the transistor $Tr_4$ are turned ON and current flows through the (+24V) power source, the transistor $Tr_1$, the cassette rotating motor 36, the transistor $Tr_4$ and ground in this order, thereby normally rotating the cassette rotating motor 36 (rotating in the direction C in FIG. 4(*a*)). The threaded shaft 35 is accordingly rotated in the direction C. This rotation permits the nut 37 to move from the position $P_1$ to the position $P_6$ and the guiding shaft 34 of the rotatable cassette 32*a* is rotatively slided within the guiding hole 33*a* of the supporting plate 33 to move from the position $Q_1$ to the position $Q_6$ via the positions $Q_2$, $Q_3$, $Q_4$ and $Q_5$.

Thereafter, the nut 37 reaches the sensor $HP_2$ to turn the sensor $HP_2$ ON, thereby halting the cassette rotating motor 36. At this stage, the rotatable cassette 32*a* is set in the predetermined longitudinal feeding station (A4R position).

When the microcomputer 51 causes the output terminal CCW to be high and the output terminal CW to be low in the above state, the transistors $Tr_2$ and $Tr_3$ are turned ON, and current flows through the (+24 V) power source, the transistor $Tr_2$, the cassette rotating motor 36, the transistor $Tr_3$ and ground in this order, thereby reversely rotating the cassette rotating motor 36. This rotation permits the rotatable cassette 32*a* to rotate from the longitudinal feeding station to the lateral feeding station with the guiding shaft 34 moving in the opposite process to the foregoing (i.e. from the position $Q_6$ to the position $Q_1$). When the sensor $HP_1$ is turned ON thereafter, the cassette rotating motor 36 is halted and the rotatable cassette 32*a* is set in the predetermined lateral feeding station.

Referring now to the flow chart of FIG. 1, the control operation of the microcomputer 51 for the rotatable cassette 32*a* of the first rotatable cassette unit 32*a* and the rotatable cassette 32*b* of the first rotatable cassette unit 27 will be explained hereinbelow. In the following description, assume that the rotatable cassette 32*a* of the first rotatable cassette unit 26 is selected for paper feeding and the cassette rotation key 48 corresponding to the rotatable cassette 32*a* is depressed.

After copying conditions are registered when copying operation is in a stand-by state (Step 1), the microcomputer 51 determines whether or not the copy button 41 is depressed (Step 2), and whether or not the cassette rotation key 48 is depressed (Step 3). Incidentally, the cassette rotation signal entered by depressing the cassette rotation key 48 prior to the actuation of the copy button 41 is stored by the memory means of the microcomputer 51. If it is determined in Step 2 and Step 3 that the copy button 41 is depressed and the cassette rotation key 48 is not depressed, the program immediately proceeds to Step 15, thereby performing a copying operation.

On the other hand, if the copy button 41 and the cassette rotation key 48 are both depressed, the microcomputer 51 then determines whether the sensor $HP_1$ is ON (Step 4). If the sensor $HP_1$ is ON, the output terminal CW becomes high (Step 5) and the output terminal CCW becomes low (Step 6). This causes the cassette rotating motor 36 to be normally rotated thereby rotating the rotatable cassette 32*a* to the longitudinal feeding station. Thereafter, the microcomputer 51 determines whether the sensor $HP_2$ has been turned ON (Step 7), and if the sensor $HP_2$ has been turned ON, the output terminal CW becomes low (Step 8). This causes the cassette rotating motor 36 to be halted and the rotatable cassette 32*a* is set in the longitudinal feeding station. Then, a copying operation is performed (Step 15).

If it is determined in Step 4 that the sensor $HP_1$ is not ON, the microcomputer 51 then determines whether the sensor $HP_2$ is ON (Step 9). If the sensor $HP_2$ is ON, the microcomputer 51 causes the output terminal CW to be low (Step 10) and the output terminal CCW to be high (Step 11). This causes the rotatable cassette 32*a* to be rotated to the lateral feeding station. Thereafter, it is determined whether the sensor $HP_1$ is ON (Step 12), and if the sensor $HP_1$ is ON, the microcomputer 51 causes the output terminal CCW to be low (Step 13). In this stage, the rotatable cassette 32 is positioned in the lateral feeding station. Then, the program proceeds to Step 15 and a copying operation is performed. If it is determined in Step 9 that the sensor $HP_2$ is not ON, the occurrence of trouble is indicated (Step 14) since the rotatable cassette 32*a* is not set in either of the longitudinal feeding station or the lateral feeding station.

In the above control operation, since the rotatable cassette 32*a* or 32*b* is rotated after turning on the copy button 41 under the condition that the rotatable cassette 32*a* in the first rotatable cassette unit 26 or the rotatable cassette 32*b* in the second rotatable cassette unit 27 is selected for paper feeding, the rotatable cassette 32*a* or 32*b* is not rotated each time the cassette rotation key 48 or 49 is erroneously operated by the operator. Since the rotatable cassette 32*a* or 32*b* is selected by finally depressing the cassette rotation key 48 or 49 prior to the turning on of the copy button 41 and is rotated after the copy button 41 is turned ON, the useless rotation of the rotatable cassette 32*a* or 32*b* can be prevented. In this embodiment, the arrangement is made such that a cassette rotation permission signal is entered in the microcomputer 51 by turning ON the copy button 41.

In this embodiment, the number of cassettes can be arbitarily changed on condition that the copying machine has at least one rotatable cassette in order to perform the foregoing control operation.

Figure 9:
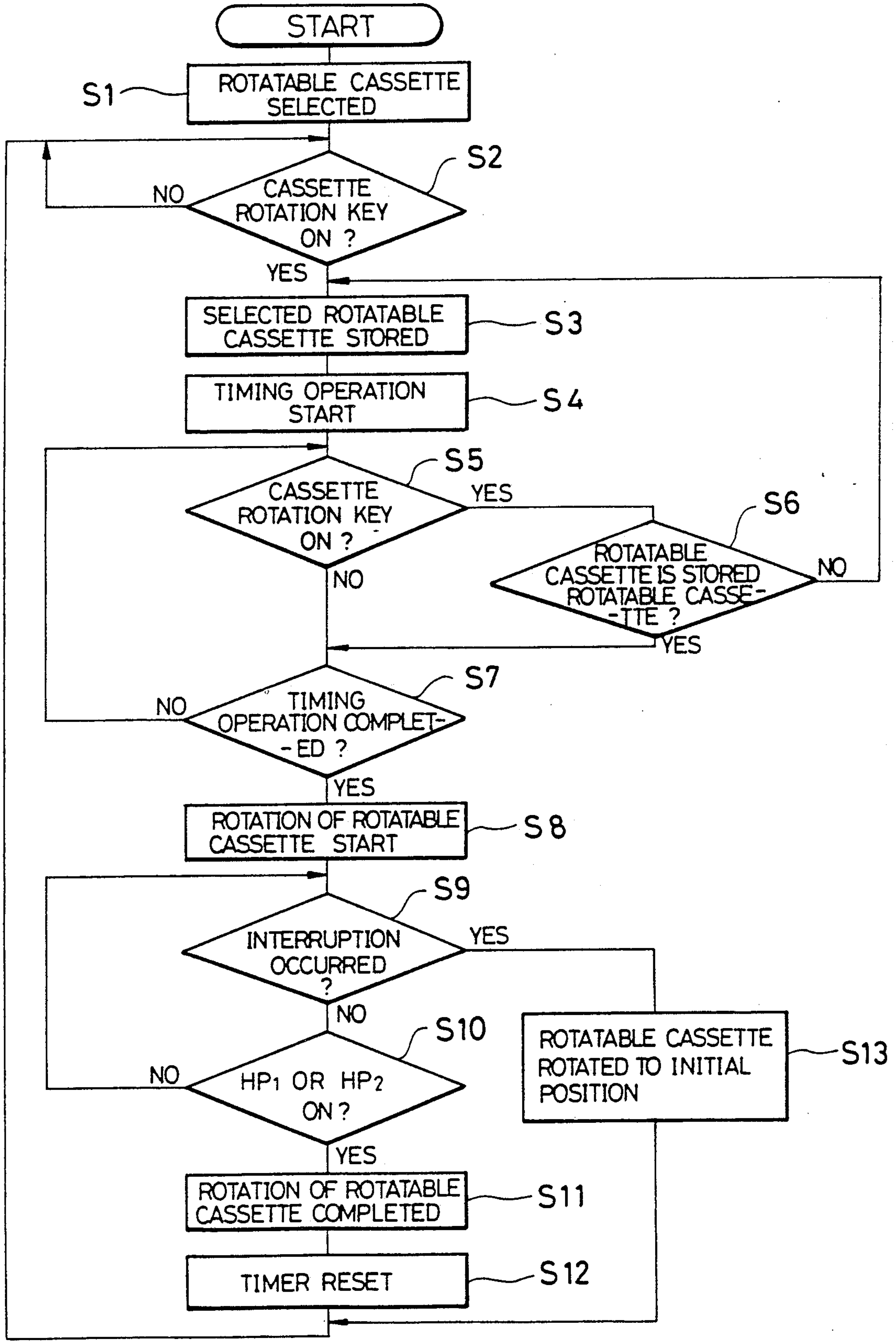
FIG. 9 is a flow chart showing the control operation of a microcomputer of another embodiment of the present invention.

Now reference is made to FIGS. 7 and 9 for explaining another embodiment of the present invention. For simplifying the explanation, those members having functions substantially similar to those of the members in the foregoing embodiment are indicated by the same reference numerals and the description thereof is omitted.

In the image forming apparatus of this embodiment, the microcomputer 51 shown in FIG. 7 functions as control means, memory means and a timer which is timing means, and performs the control operation shown in FIG. 9.

The control operation of the microcomputer 51 having the above functions for the rotatable cassette 32*a* of the first rotatable cassette unit 26 and the rotatable cassette 32*b* of the second rotatable cassette unit 27 will be explained hereinafter with reference to the flow chart of FIG. 9.

First of all, the rotatable cassette 32*a* of the first rotatable cassette unit 26 or the rotatable cassette 32*b* of the second rotatable cassette unit 27 is selected for paper feeding (Step 1) and the microcomputer 51 then determines which of the cassette rotation keys 48 and 49 that respectively correspond to the above cassettes is turned ON (Step 2). When either of the cassette rotation keys 48 and 49 is turned ON, either of the rotatable cassette 32*a* of the first rotatable cassette unit 26 and the rotatable cassette 32*b* of the second rotatable cassette unit 27 that corresponds to the cassette rotation key which has been turned ON is memorized as a selected paper feed cassette (Step 3). In other words, a cassette rotation signal corresponding to the selected paper feed cassette which is the rotatable cassette 32*a* or 32*b* is stored.

Thereafter, timing carried out by a timer is commenced (Step 4) and it is determined which of the cassette rotation keys 48 and 49 has been turned ON (Step 5). When either of the above has been turned ON, the microcomputer 51 determines whether the rotatable cassette 32*a* or 32*b* that corresponds to the cassette rotation key which has been turned ON is equal to the rotatable cassette memorized in Step 3 (Step 6). If it is not the same, the program returns to Step 3 in order to memorize the rotatable cassette 32*a* or 32*b* and timing operation is again performed by the timer (Step 4).

On the other hand, if it is determined in Step 6 that the rotatable cassette corresponding to the cassette rotation key which has been turned ON is equal to the memorized rotatable cassette or if neither the cassette rotation key 48 nor 49 is ON, upon completion of the timing by the timer (Step 7), the rotation of the memorized rotatable cassette 32*a* or 32*b* is commenced (Step 8). If interruption that causes the cassette rotatable key 48 or 49 to be turned ON is not executed thereafter (Step 9) and the sensor $HP_1$ or $HP_2$ is turned ON (Step 10), the rotation of the rotatable cassette 32*a* or 32*b* is halted (Step 11), the timer is reset (Step 12) and the program returns to Step 2. On the other hand, if such interruption is executed in Step 9, the rotatable cassette 32*a* or 32*b* is rotated to a predetermined initial feeding station and the program returns to Step 2.

Figure 1:
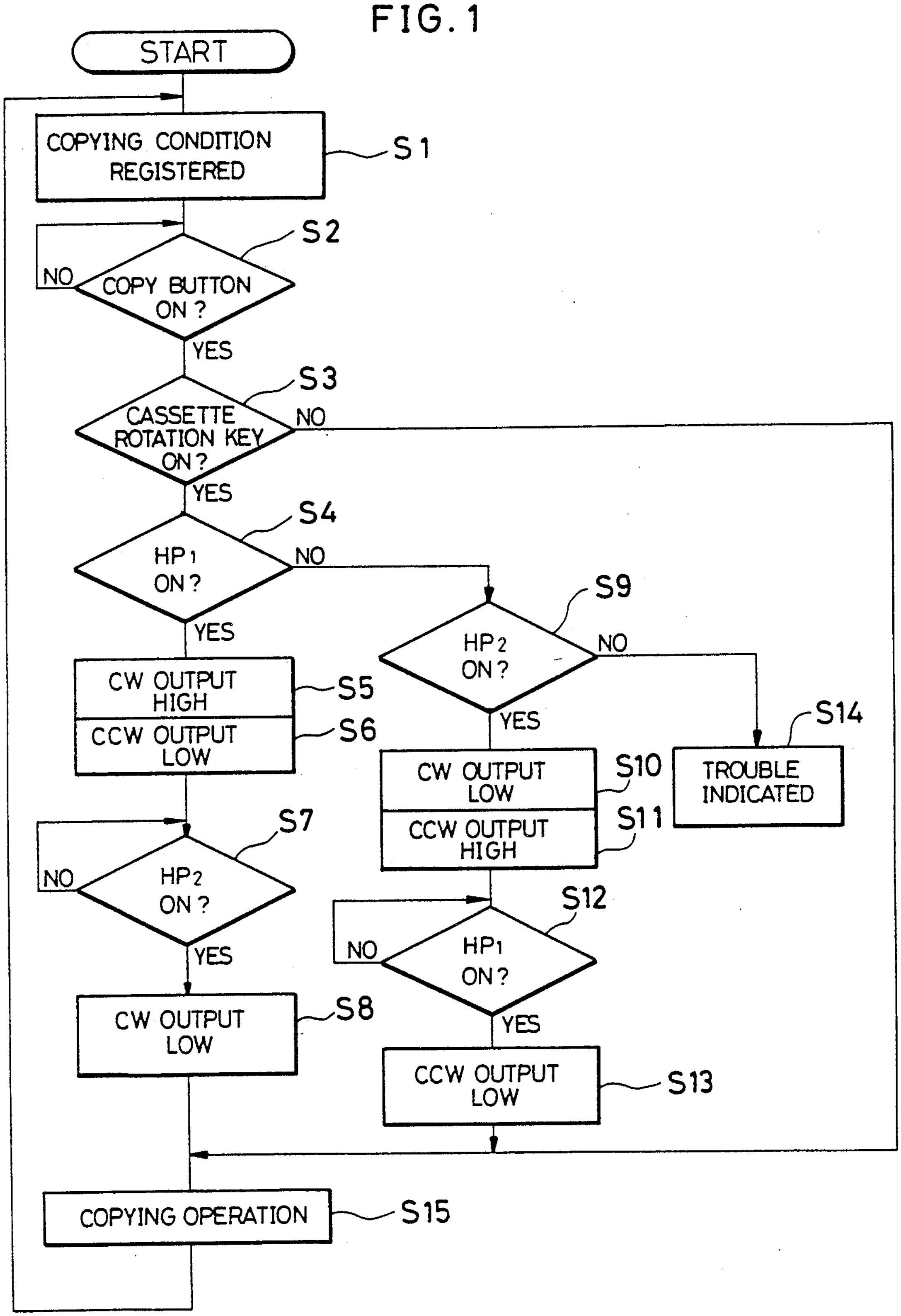
FIGS. 1 to 8 show one embodiment of the present invention.

The operations in Steps 8, 10 and 11 in the above description are substantially equal to those in Steps 4 to 14 in FIG. 1.

In the above control operation, after turning ON the cassette rotation key 48 or 49, timing by the timer is commenced and if the rotatable cassette which has been selected as a paper feed cassette is not changed until the completion of the timing, the rotation of the selected rotatable cassette is commenced. Therefore, even if the rotation of the rotatable cassette 32*a* or 32*b* is erroneously inputted by the operator, the useless rotation of the rotatable cassette 32*a* or 32*b* can be avoided by changing the rotatable cassette to be rotated so that only the rotatable cassette finally selected at the moment of the completion of the timing is rotated. In this embodiment, a cassette rotation permission signal is entered in the microcomputer 51 upon completion of the timing by the timer.

Figure 10:
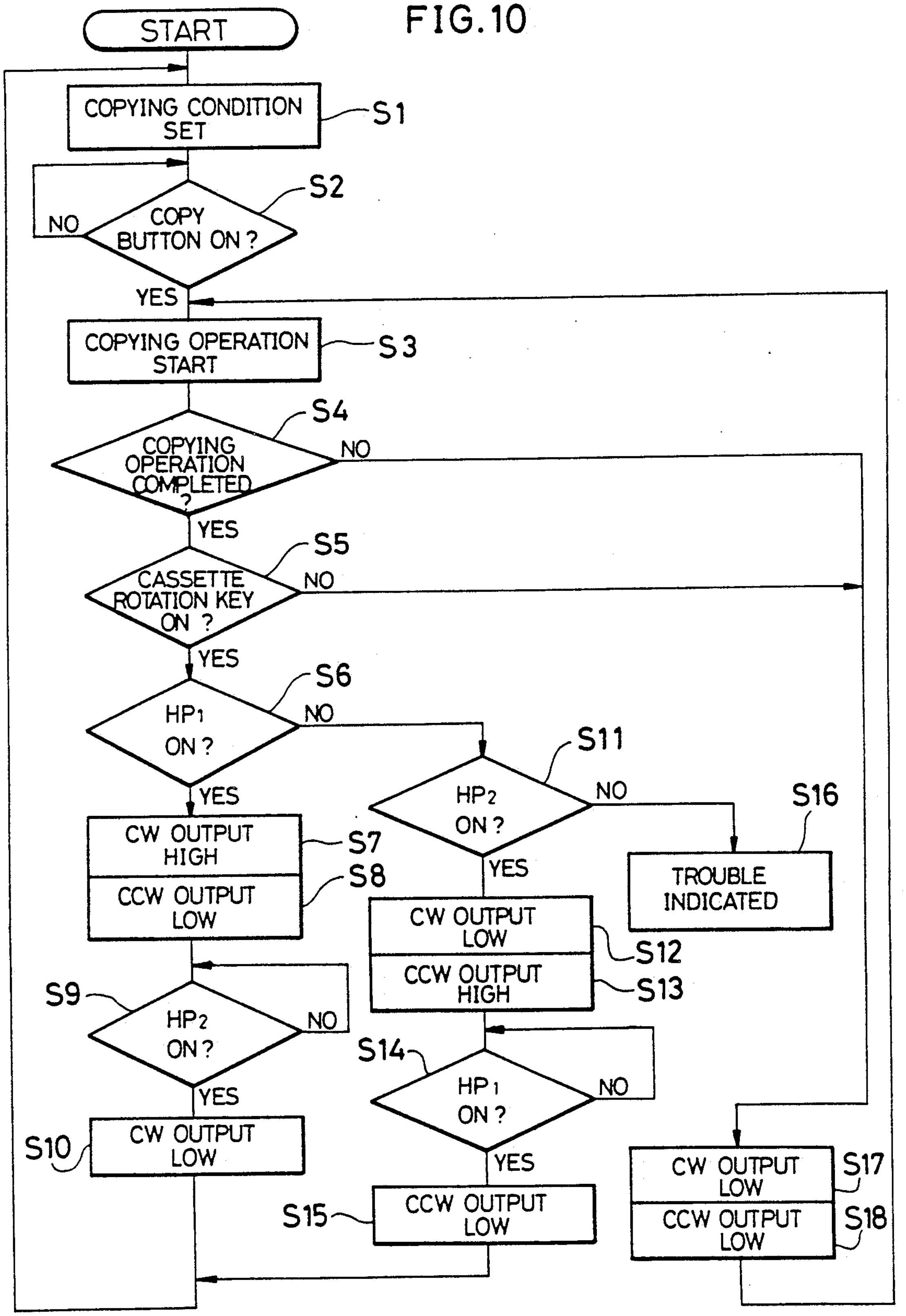
FIG. 10 is a flow chart showing the control operation of a microcomputer of still another embodiment of the present invention.

The following description will discuss still another embodiment of the present invention with reference to FIGS. 7 and 10. For convenience of explanation, those members having substantially similar functions to those of the members described in the first embodiment are indicated by the same reference numerals and the description thereof is omitted.

The image forming apparatus of the present invention comprises the microcomputer 51 shown in FIG. 7. The paper discharge detection switch 58 connected to the microcomputer 51 functions as image formation completion detecting means. In the microcomputer 51, a copying operation is deemed to be completed when the discharge of a paper to the sorter 19 is detected by the paper discharge detection switch 58, that is, when the last paper passes by the the paper discharge detection switch 58 in a continuous copying operation, and when the copy paper passes by the same in a single copying operation. The microcomputer 51 functions as control means, memory means and a timer, and performs the control operation shown in FIG. 10.

Now reference is made to the flow chart of FIG. 10 for explaining the control operation of the microcomputer 51 in the above arrangement for the rotatable cassette 32a in the first rotatable cassette unit 26 and the rotatable cassette 32b in the second rotatable cassette. In the following description, assume that the rotatable cassette 32a in the first rotatable cassette unit 26 is selected for paper feeding and the cassette rotation key 48 corresponding to the rotatable cassette 32a is operated.

First of all, copying conditions such as exposure, magnification, a paper size are set by the operator. The microcomputer 51 executes the corresponding process (Step 1) and then determines whether the copy button 41 is turned ON (Step 2). If the copy button 41 is turned ON, a copying operation is commenced (Step 3), and charging, paper feeding, exposing and development and other operations are performed. Thereafter, if the copying operation is completed (Step 4) and the cassette rotation key 48 is depressed (Step 5), the rotatable cassette 32a is rotated in a desired direction (Steps 6 to 16). The operations executed in Steps 6 to 16 are the same as the operations in Steps 4 to 14 in FIG. 1. A cassette rotation signal entered before the completion of the copying operation is stored in the memory means of the microcomputer 51.

When the copying operation is not completed in Step 4 and the cassette rotation key 48 is not depressed in Step 5, the microcomputer 51 causes the outputs of the output terminals CCW and CW to be low (Step 17, Step 18), thereby prohibiting the rotation of the rotatable cassette 32a, and the program returns to Step 3.

In the above control operation, since the rotation of the rotatable cassette 32a is prohibited after the start of the copying operation until the completion thereof, and since the rotatable cassette 32a is rotated after the completion of the copying operation if the cassette rotation key 48 is depressed and the rotation of the rotatable cassette 32a is required, a paper jamming resulted from the rotation of the rotatable cassette 32a during copying operation can be avoided. With such an arrangement, the useless rotation of the rotatable cassette 32a back to an initial feeding station, which is required for performing image formation to compensate for the deficient copy caused by the paper jamming, can be avoided. In this embodiment, a cassette rotation permission signal is entered in the microcomputer 51 by the paper discharge detection switch 58 at the time of detecting the completion of the copying operation.

Figure 11:
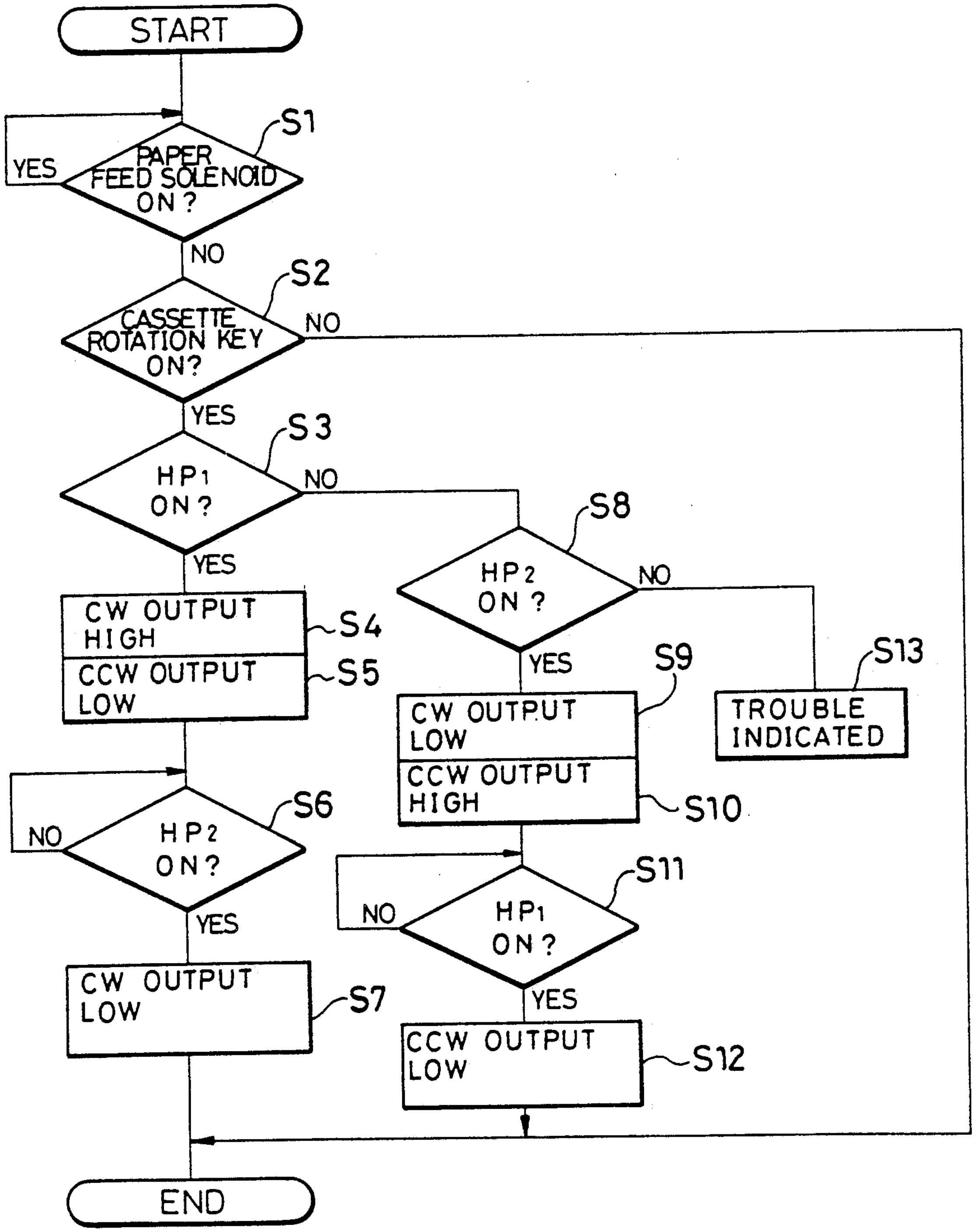
FIG. 11 is a flow chart showing the control operation of a microcomputer of yet another embodiment of the present invention.

The following description describes still another embodiment of the present invention with reference to FIGS. 2, 7, and 11. For convenience of explanation, those members having substantially similar functions to those of the members described in the first embodiment are indicated by the same reference numerals and the description thereof is omitted.

The image forming apparatus of this embodiment comprises the microcomputer 51 shown in FIG. 7. The rotatable cassette paper feed solenoid 57 connected to the microcomputer 51, and the paper feeding rollers 26a and 27a respectively disposed in the first and second rotatable cassette units 26 and 27 shown in FIG. 2 compose paper feeding means. The rotatable cassette paper feed solenoid 57 is controlled by the microcomputer 51, so that when a paper feeding start signal is generated, the paper feeding rollers 26a and 27a are pressed against paper stored in the rotatable cassettes 32a and 32b, thereby performing paper feeding, and when a paper feeding completion signal is generated, the paper feeding rollers 26a and 27a are kept away from the paper stored in the rotatable cassettes 32a and 32b. The microcomputer 51 functions as control means and memory means, and performs the control operation shown in FIG. 11.

The following description describes the control operation of the microcomputer 51 in the above arrangement for the rotatable cassette 32a of the first rotatable cassette unit 26 and the rotatable cassette 32b of the second rotatable cassette unit 27, with reference to the flow chart of FIG. 11. In the following description, assume that the rotatable cassette 32a of the first rotatable cassette unit 26 is selected for paper feeding and the cassette rotation key 48 corresponding to the rotatable cassette 32a is depressed.

Firstly, the microcomputer 51 determines whether the rotatable cassette paper feed solenoid 57 is ON (Step 1) and whether the cassette rotation key 48 is ON (Step 2). If the rotatable cassette paper feed solenoid 57 is OFF and the cassette rotation key 48 is ON, the rotatable cassette 32 is rotated in a desired direction (Steps 3 to 13). The operations in Steps 3 to 13 are substantially equal to those in Steps 4 to 14 in FIG. 1. A cassette rotation signal entered before the rotatable cassette paper feed solenoid 57 is turned OFF is stored in the memory means of the microcomputer 51.

If the rotatable cassette paper feed solenoid 57 is turned OFF in Step 1 and the cassette rotation key 48 is not ON in Step 2, the rotatable cassette 32a is not rotated.

In the above control operation, since the rotation of the rotatable cassette 32a is prohibited while the rotatable cassette paper feed solenoid 57 is ON, i.e., during paper feeding from the rotatable cassette 32a, and the rotatable cassette 32a is rotated if the cassette rotation key 48 is ON upon completion of the paper feeding from the rotatable cassette 32a, a paper jamming caused by the rotation of the rotatable cassette 32a during paper feeding from the rotatable cassette 32a can be avoided. With such an arrangement, the useless rotation of the rotatable cassette 32a back to an initial feeding station, which is required for performing image formation to compensate for the deficient copy caused by the paper jamming, can be avoided. In this embodiment, a cassette rotation permission signal is entered in the microcomputer 51 upon turning OFF of the rotatable cassette paper feed solenoid 57.

Figure 12:
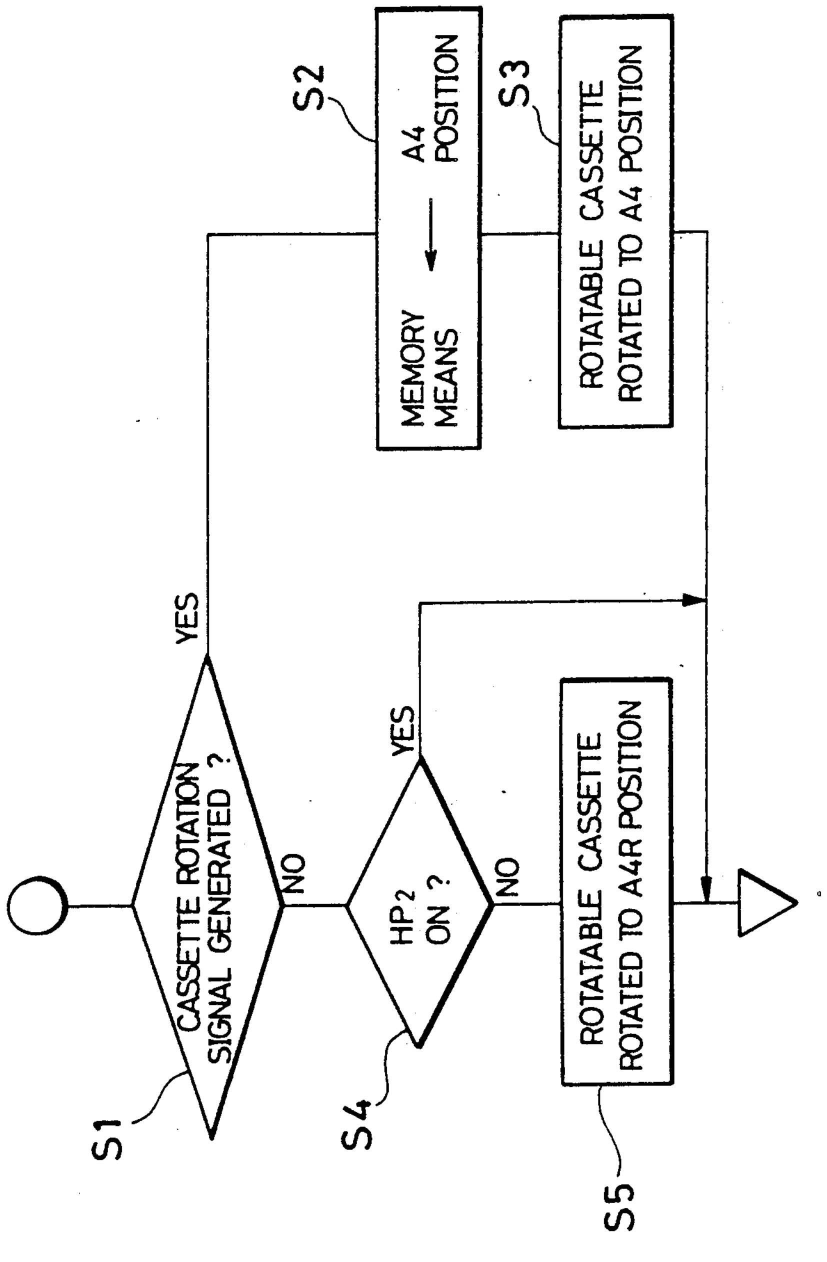
FIG. 12 is a flow chart showing the control operation of a microcomputer of another embodiment of the present invention.

With reference to FIGS. 7 and 12, yet another embodiment of the present invention will be explained hereinbelow.

An image forming apparatus according to this embodiment is designed such that when the rotatable cassette 32a or 32b is out of both the longitudinal feeding station and the lateral feeding station, for example, after supplying paper thereto, the cassette can be reset in the initial feeding station without any special operation carried out by the operator. The copying machine of the embodiment has the same structure as that of the first embodiment described above.

Reference is now made to the flow chart of FIG. 12 for explaining the control procedures. In the following description, assume that the cassette rotation key 48 corresponding to the first rotatable cassette unit 26 is depressed.

Further, assume that A4 size paper is stored in the rotatable cassette 32a of the first rotatable cassette unit 26 and the rotatable cassette 32a is positioned in the longitudinal feeding station (i.e. A4R position).

It is determined in Step 1 whether a cassette rotation signal has been generated by, for example, operating the cassette rotation key 48. If a cassette rotation signal has been generated, the microcomputer 51 stores the lateral feeding station (A4 position) in the memory means (Step 2) so as to rotate the rotatable cassette 32*a* from the longitudinal feeding station (A4R position) to the lateral feeding station. Then, the rotatable cassette 32*a* is rotated to the lateral feeding station with the same process as those of the foregoing embodiments (Step 3) and a copying operation is performed thereafter.

On the other hand, if a cassette rotation signal is not generated in Step 1, it is determined whether the sensor $HP_2$ is ON (Step 4). If the sensor $HP_2$ is ON, the rotatable cassette 32*a* is positioned in the longitudinal feeding station which is stored in the memory means of the microcomputer 51 and therefore a copying operation is immediately performed without executing the process in Step 5.

On the other hand, If the sensor $HP_2$ is OFF in Step 4, the rotatable cassette 32*a* is not positioned in the longitudinal feeding station which has been selected, and therefore the microcomputer 51 actuates the cassette rotating motor 36 to rotate the rotatable cassette 32*a* to the longitudinal feeding station (A4R position) (Step 5), and then a copying operation is performed.

With such control operation, even if the rotatable cassette 32*a* gets out of a predetermined feeding station due to some external force, it can be reset in the initial feeding station.

Figure 13:
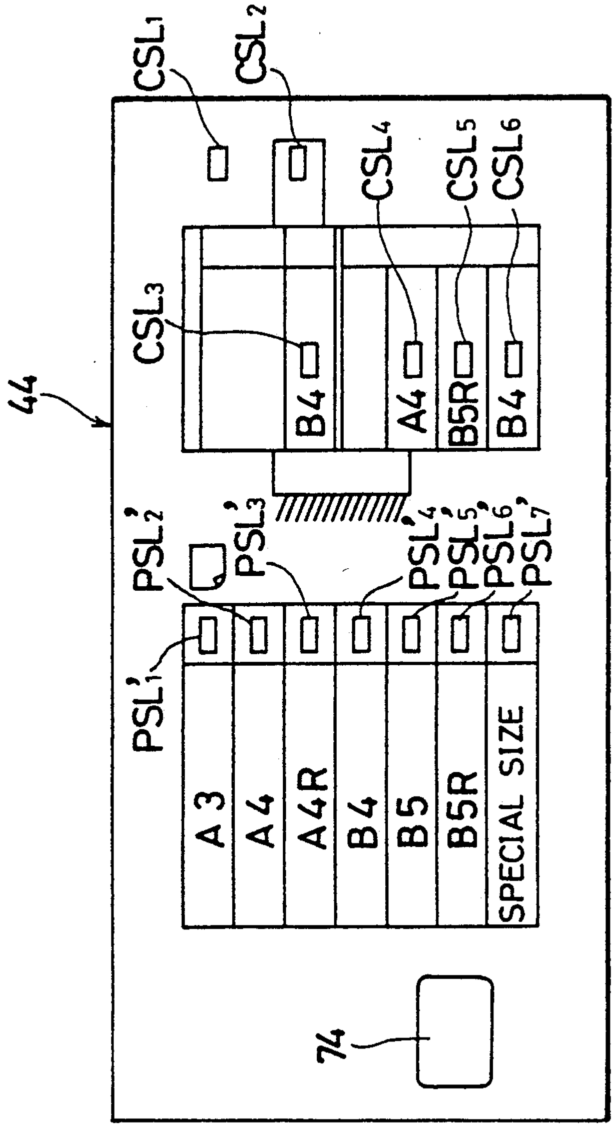
FIGS. 13 and 14 show another embodiment of the present invention.
Figure 14:
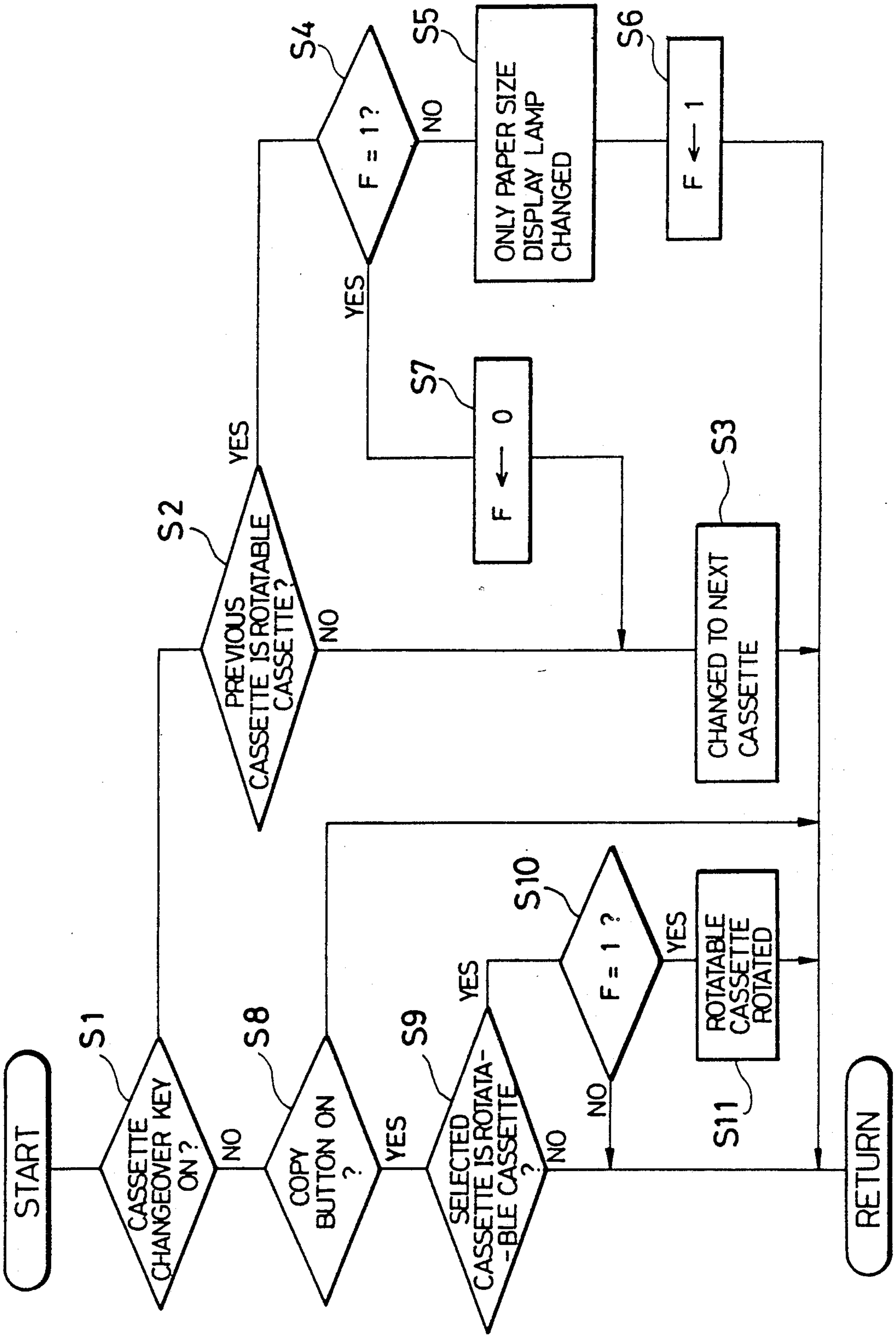

Next, reference is made to FIGS. 13 and 14 for explaining yet another embodiment of the present invention.

The image forming apparatus of this embodiment has basically the same structure as that of the first embodiment, but they differ from each other in that the number of operation keys on the cassette operation unit 44 of the operation panel 40 is reduced in the latter apparatus.

Figure 6:
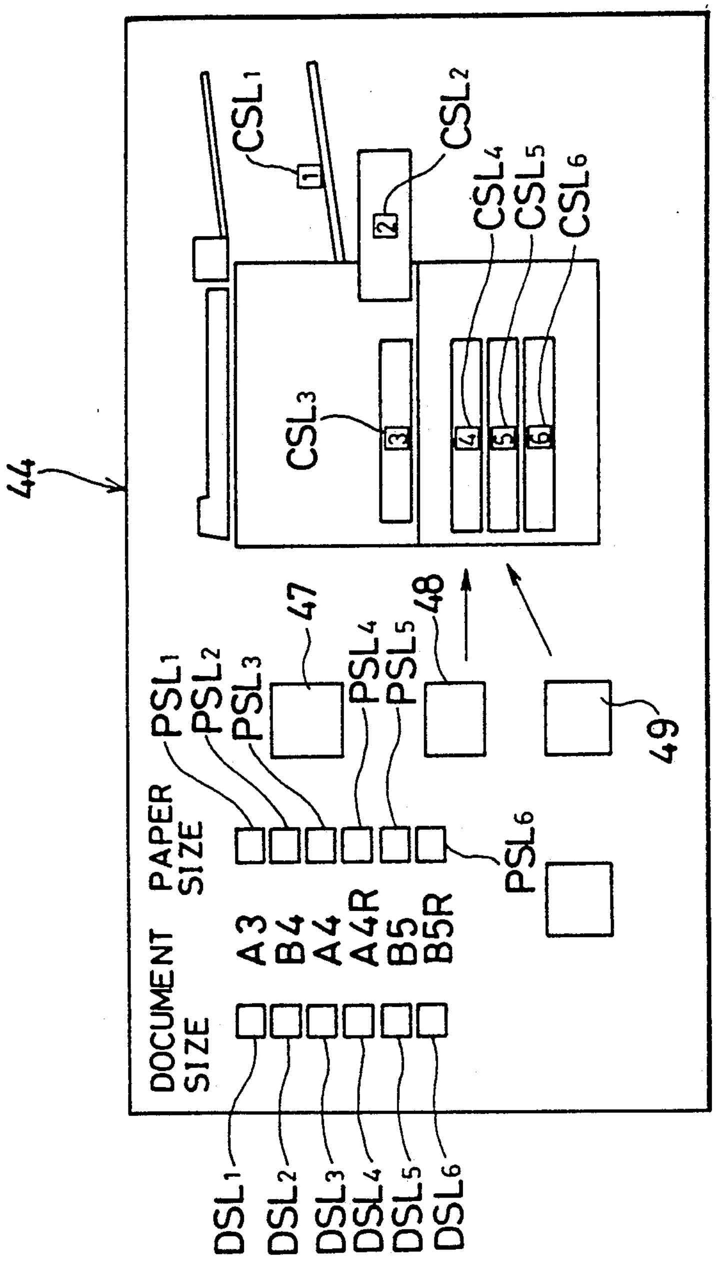

More specifically, in this embodiment, the structure of the cassette operation unit 44 is, as shown in FIG. 13, substantially the same as that of the first embodiment (see FIG. 6(*b*)), but provided with only a cassette changeover key 74 instead of the cassette changeover key 47 and the cassette rotation keys 48 and 49 in the first embodiment. As will be described later, cassette selection and instruction to rotate the rotatable cassettes 32*a* or 32*b* are performed by a single cassette changeover key 74 in this embodiment. Also, there is provided a paper size display lamp $PSL_7'$ for displaying a special size paper in addition to paper size display lamps $PSL_1'$ to $PSL_6'$ for displaying A3, A4, A4R, B4B5R and B5R papers respectively. The document size display lamps are not shown in FIG. 13.

Referring now to the flow chart of FIG. 14, the control operation of the microcomputer 51 for the cassette display lamps $CSL_1$ to $CSL_6$, the paper size display lamps $PSL_1'$ to $PSL_7'$, and the rotatable cassettes 32*a* and 32*b* is explained hereinbelow.

In the following description, assume that the special size paper is stored in the manual paper feeder 30; A4 size paper is stored in the first fixed cassette 29 and the rotatable cassette 32*a* of the first rotatable cassette unit 26; B4 size paper is stored in the second fixed cassette 28 and the third fixed cassette 25; and B5 size paper is stored in the rotatable cassette 32*b* of the second rotatable cassette unit 27.

The paper size display lamps $PSL_2'$ and $PSL_3'$ correspond to the rotatable cassette 32*a*, and the paper size display lamps $PSL_5'$ and $PSL_6'$ correspond to the rotatable cassettes 32*b* accordingly. When the cassette display lamp corresponding to the rotatable cassette 32*a* or 32*b* (i.e. $CSL_4$ or $CSL_5$) is turned ON, the paper size display lamp corresponding to the feeding station of the rotatable cassette 32*a* or 32*b* at the time is turned ON. For example, when the rotatable cassette 32*a* of the first rotatable cassette unit 26 is selected and the rotatable cassette 32*a* is positioned in the lateral feeding direction (A4 position), the paper size display lamp $PSL_2$ corresponding to A4 position is turned ON.

In FIG. 14, the microcomputer 51 determines whether the cassette changeover key 47 is depressed (Step 1), and if so, the microcomputer 51 then determines whether or not the cassette which has been displayed by the cassette display lamp before the actuation of the cassette changeover key 47 is the rotatable cassette 32*a* or 32*b* (Step 2). If it is neither the rotatable cassette 32*a* nor 32*b*, the cassette display lamp and the paper size display lamp are changed so as to correspond to the next cassette, i.e., the cassette selected by depressing the cassette changeover key 47 in Step 1 (Step 3) and the program returns to the main routine.

On the other hand, if it is determined in Step 2 that the cassette which has been displayed before the actuation of the changeover key 47 is the rotatable cassette 32*a* or 32*b*, the microcomputer 51 then determines whether a flag F provided in the memory means or other means of the microcomputer 51 is "1" (S4). The flag F is used for indicating whether the rotation of the rotatable cassette 32*a* or 32*b* is required at the stage immediately before the actuation of the cassette changeover key 47 is detected in Step 1 (i.e. whether the paper size indicated by the paper size display lamp does not correspond to the feeding station of the rotatable cassette 32*a* or 32*b*). If the above rotation is needed, the flag F is "1" and if not, the flag F is "0".

In the case it is determined in Step 4 that the flag F is not "1" (i.e. the rotation has not been required before the actuation of the cassette changeover key 47), the actuation of the cassette changeover key 47 causes the necessity of rotating the rotatable cassette 32*a* or 32*b*. The rotation becomes necessary by operating the cassette changeover key 47. In this case, only the paper size lamp is changed over (Step 5), and after setting the flag F to "1" to indicate the condition wherein the rotation is required (Step 6), the program returns to the main routine. In Step 6, the rotation of the rotatable cassette 32*a* or 32*b* is not immediately executed but only the flag F is set to "1".

If it is determined in Step 4 that the flag F is "1" (i.e. the rotation has been required before the actuation of the cassette changeover key 47), the cassette has been changed to the next by operating the cassette changeover key 47. Therefore, after the condition wherein the rotation is required is changed by setting the flag F to "0" (Step 7), the cassette is changed to the next cassette (Step 3) and the program returns to the main routine.

The processes in Steps 1 to 6 will be explained by way of an example. Suppose that B4 size paper is stored in the second fixed cassette 28; A4 size paper is stored in the rotatable cassette 32*a* of the first rotatable cassette unit 26 which is set in the lateral feeding station (i.e. A4 position); and B5 size paper is stored in the rotatable cassette 32*b* of the second rotatable cassette unit 27 which is set in the longitudinal feeding station (i.e. B5R position). Further, assume that the second fixed cassette 28 is selected and the cassette display lamp $CSL_3$ is lighted.

In the flow chart of FIG. 14, after the cassette changeover key 47 is depressed under the above condition, the program proceeds from Step 1 to Step 2 and it is determined whether or not the selected cassette is the rotatable cassette 32*a* or 32*b*. Since the second fixed cassette 28 is selected, the result is NO. The program proceeds to Step 3 and the next cassette i.e. the rotatable cassette 32*a* of the first rotatable cassette unit 26 is displayed. More concretely, the cassette display lamp $CSL_3$ is turned OFF and the cassette display lamp $CSL_4$ is turned ON, and successively, the paper size display lamp $PSL_4$ is turned OFF and the paper size display lamp $PSL_2$ is turned ON. Upon completion of the changeover of the above display switches, the program returns to the main routine.

Thereafter, the cassette changeover key 47 is again depressed and the program proceeds from Step 1 to Step 2 at which the determination is executed. The result is YES since the rotatable cassette 32*a* of the first rotatable cassette unit 26 is selected with the cassette display lamp $CSL_4$ being lighted. Then, it is determined in Step 4 whether the flag F is "1". The feeding station of the rotatable cassette 32*a* corresponds to the paper size display lamp $PSL_2$ at that time, and therefore the flag is "0" and the result of the determination is NO. The program then proceeds to Step 5. At that time, the cassette display lamp $CSL_4$ is continuously lighted. The paper size display lamp $PSL_2$ that displays A4 size is turned OFF, and the lamp $PSL_3$ that displays A4R size is turned ON. The flag F is set to "1" at Step 6 so as to indicate the condition wherein the rotation is required, and the program returns to the main routine.

After the cassette changeover key 47 is again depressed, the program proceeds from Step 1 to Step 2. Since the rotatable cassette 32*a* of the first rotatable cassette unit 26 is selected, the program proceeds to Step 4 where it is determined whether the flag F is "1". The flag F is "1" at that time, and the program therefore proceeds to Step 7 where the flag F is set to "0". At Step 3, the cassette display lamp $CSL_4$ is turned OFF and the lamp $CSL_5$ is turned ON, and the paper size display lamp $PSL_3$ is turned OFF and the lamp $PSL_6$ is turned ON so as to indicate the next cassette, i.e., the rotatable cassette 32*b* of the second rotatable cassette unit 27.

The following description describes the processes in Steps 8 to 11.

If the cassette changeover key 47 is not depressed in Step 1 and the coppy button 41 is not depressed in Step 8, the program returns to the main routine. If the cassette changeover key 47 is not depressed in Step 1 and the copy button 41 is depressed in Step 8, the microcomputer 51 determines whether or not the selected cassette is the rotatable cassette 32*a* or 32*b* (Step 9). If the selected cassette is not the rotatable cassette 32*a* or 32*b*, the program returns to the main routine and a copying operation is performed. If it is determined in Step 9 that the rotatable cassette 32*a* or 32*b* is selected, the microcomputer 51 then determines whether the flag F is "1" (the condition wherein the rotation is required) (Step 10). If the flag F is not "1", the program returns to the main routine to perform a copying operation. On the other hand, if it is determined in Step 10 that the flag is "1", after rotating the rotatable cassette 32*a* or 32*b* to a predetermined feeding station (Step 11), the program returns to the main routine to perform a copying operation.

As an example of the above control operation, the process is explained, wherein the first fixed cassette 29 storing A4 size paper is changed to the rotatable cassette 32*b* of the second rotatable cassette unit 27 so as to feed B5 size paper.

When the first fixed cassette 29 is selected, the cassette display lamp $CSL_2$ and the paper size display lamp $PSL_2$ (indicating A4) are lighted. If the cassette changeover key 47 is depressed at this stage, the cassette display lamp $CSL_2$ is turned OFF and the lamp $CSL_3$ (indicating the second fixed cassette 28) is turned ON (i.e. the cassette display lamp is changed from $CSL_2$ to $CSL_3$). At the same time, the paper size display lamp $PSL_2$ is turned OFF and the lamp $PSL_4$ (indicating B4) is turned ON (i.e. the paper size display lamp is changed from $PSL_2$ to $PSL_4$).

Thereafter, the cassette changeover key 47 is depressed, thereby changing the cassette display lamp from $CSL_3$ to $CSL_4$ (indicating the first rotatable cassette unit 26) and if the rotatable cassette 32*a* is positioned in the lateral feeding station, the paper size display lamp is changed from $PSL_4$ (indicating B4) to $PSL_2$ (indicating A4).

When the cassette changeover key 47 is depressed thereafter, the cassette display lamp $CSL_4$ is not changed, while only the paper size display lamp is changed from $PSL_2$ (indicating A4) to $PSL_3$ (indicating A4R). At this stage, the feeding station is not changed by rotation. That is, the rotatable cassette 32*a* remains being positioned in the lateral feeding station (A4 position). This is the condition in which the rotation is required.

When the cassette changeover key 47 is again depressed, the cassette display lamp is changed from $CSL_4$ to $CSL_5$ (indicating the second rotatable cassette unit 27). If the rotatable cassette 32*b* is positioned in the longitudinal feeding station, the paper size display lamp is changed from $PSL_3$ (indicating A4R) to $PSL_6$ (indicating B5R).

When the cassette changeover key 47 is again depressed, the cassette display lamp $CSL_5$ is continuously lighted, while the paper size display lamp is changed from $PSL_6$ to $PSL_5$ (indicating B5).

When the copy button 41 is depressed in the above state, it is considered that B5 size paper has been selected, and the rotatable cassette 32*b* of the second rotatable cassette unit 27 is rotated to the lateral feeding station (B5 position). After that, paper feeding is commenced and a copying operation is performed.

In the above operation, the rotatable cassette 32*a* and 32*b* are designed to be positioned in the feeding station of high frequency in use when the copying machine is in a stand-by state, and the paper size display lamp corresponding to the feeding station in which the rotatable cassette 32*a* or 32*b* is positioned at that time is turned ON when the rotatable cassette 32*a* or 32*b* is selected, whereby paper of high frequency in use can be efficiently selected by fewer number of selecting operations.

Figure 15:
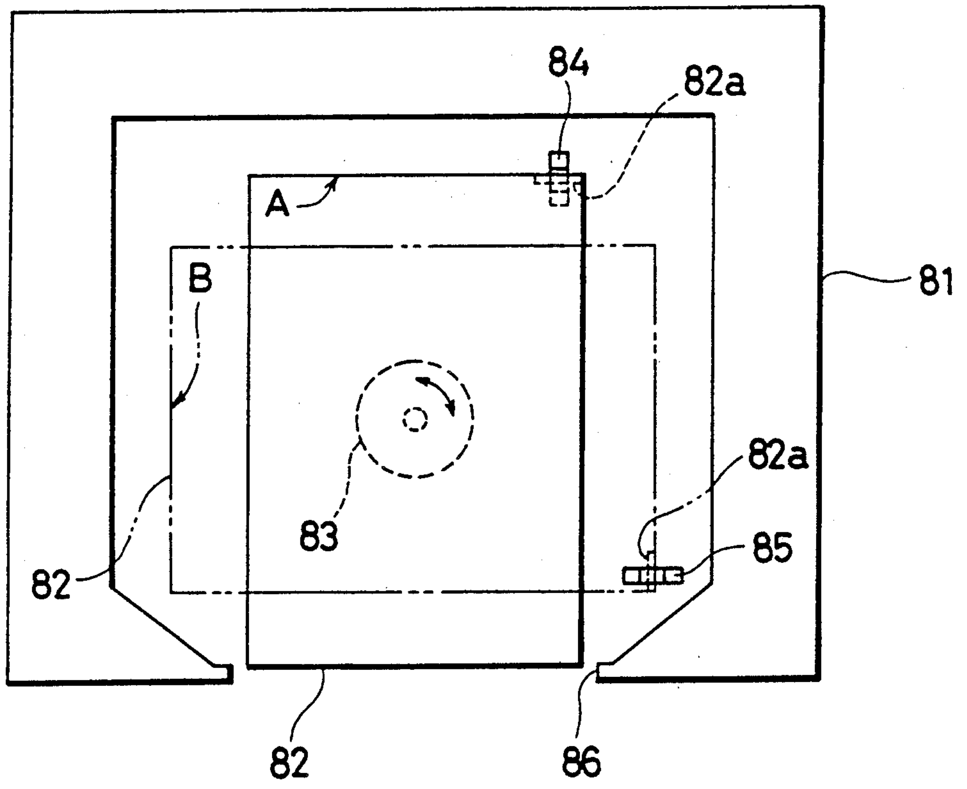
FIGS. 15 to 17 show still another embodiment of the present invention.
Figure 16:
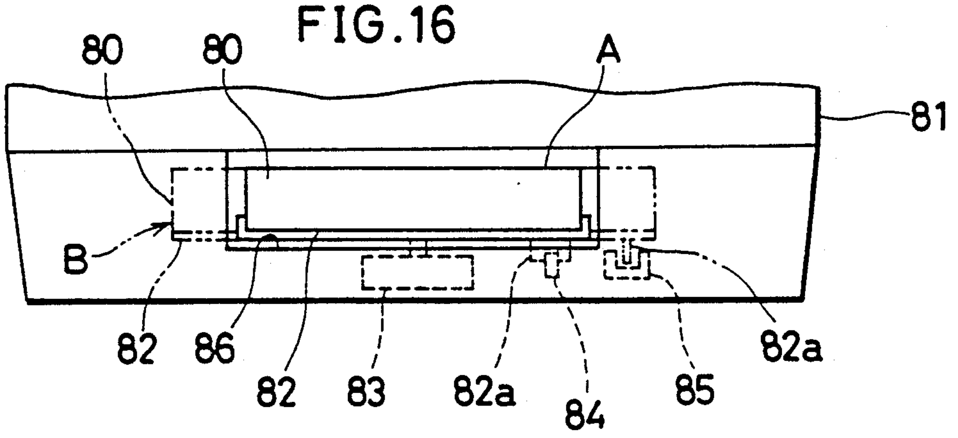
Figure 17:
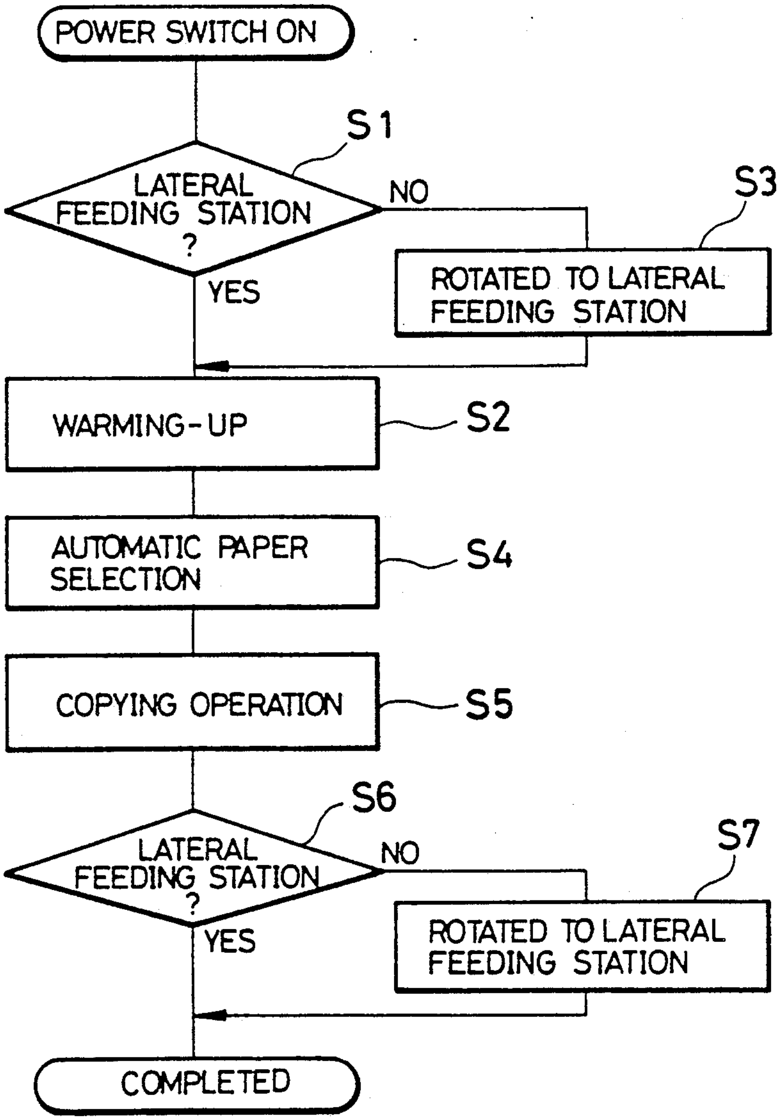

With reference to FIGS. 15 to 17, still another embodiment of the present invention will be explained.

As shown in FIGS. 15 and 16, the image forming apparatus of this embodiment is designed such that the rotatable cassette 80 can be inserted and taken out in and from the main body 81 only when it is in either one of the feeding stations. For example, the rotatable cassette 80 can be inserted and taken out only when it is in the lateral feeding station.

The rotatable cassette 80 is mounted on a cassette mounting table 82 which is supported at the center position thereof so as to be rotated by a cassette rotating motor 83 between the lateral feeding station A and the longitudinal feeding station B.

One corner of the cassette mounting table 82 is provided with a projection 82*a* and in the main body 81, there are provided a sensor 84 for detecting that the rotatable cassette 80 is positioned in the lateral feeding station A and a sensor 85 for detecting that the rotatable cassette 80 is positioned in the longitudinal feeding station B, those sensors 84 and 85 respectively being composed of a photointerrupter or similar device used for photo-interruption together with the projection 82*a*.

The main body 81 is also provided with an opening 86 from which the rotatable cassette 80 is taken out or inserted. The opening 86 is a little wider than the lateral length of the rotatable cassette 80 and narrower than the longitudinal length thereof. The rotatable cassette 80 can be, therefore, taken out or inserted only when it is positioned in the lateral feeding station A.

In the above arrangement, when the copying machine serving as an image forming apparatus is switched ON or a copying operation is completed (the completion of an image formation), the rotatable cassette 80 is set in the lateral feeding station A which is set as a position from which a cassette is taken out and inserted from and in the main body 81. Since the rotatable cassette 80 is in the lateral feeding station A whenever the rotatable cassette 80 is taken out for supplying paper thereto, it can be readily taken out from the main body 81.

There will be given an explanation on the processes of the control operation while making reference to the flow chart of FIG. 17.

When the power switch of the copying machine is turned ON, it is determined based on the output signals of the sensors 84 and 85 whether the rotatable cassette 80 is positioned in the lateral feeding station A which is set as a cassette taking-out/insertion position (Step 1).

If the rotatable cassette 80 is in the lateral feeding station A, warming-up is immediately started (Step 2). On the other hand, if the rotatable cassette 80 is positioned in the longitudinal feeding station B in Step 1, a cassette rotating motor 83 is actuated to rotate the cassette mounting table 82 through 90° to the lateral feeding station A (Step 3). After changing to the lateral feeding station A, warming-up in Step 2 is started. As described above, in the copying machine of this embodiment, the rotatable cassette 80 is always set in the cassette taking-out/insertion station when the warming-up is started after turning ON the power switch, and therefore the rotatable cassette 80 can be readily taken out from the opening 86.

After the warming-up of the copying machine is completed, an automatic paper selection process is performed in accordance with the inputs of the document size detector (not shown), magnification setting key for setting copying magnification (not shown) and the like (Step 4). After selecting the feeding station of the rotatable cassette 82 by the automatic paper selection process, a copying operation is executed (Step 5).

Upon completion of the copying operation in Step 5, it is determined again based on output signals from the sensors 84 and 85 whether the rotatable cassette 80 is positioned in the lateral feeding station (Step 6). If the rotatable cassette 80 is positioned in the lateral feeding station A, the process is completed. On the other hand, if the rotatable cassette 80 is in the longitudinal feeding station B in Step 6, the cassette rotating motor 83 is actuated to rotate the rotatable cassette 80 through 90° so as to be positioned in the lateral feeding station A (Step 7). Thereafter, the process is completed.

Since the rotatable cassette 80 returns to the cassette taking-out/insertion station each time a predetermined copying operation is completed, the rotatable cassette 80 can be readily taken out from the opening 86.

In the foregoing embodiments, a copying machine is taken as an example of the image forming apparatus, but it should be understood that the present invention is applied to other image forming apparatus such as laser printers.

As described above, the image forming apparatus of the present invention having rotatable cassettes rotated by cassette rotating means between a longitudinal feeding station from which paper is fed in a longitudinal direction thereof and a lateral feeding station from which paper is fed in a lateral direction thereof, is characterized by: (a) memory means for storing a cassette rotation signal for instructing to rotate the rotatable cassette; and (b) control means for permitting the memory means to store the cassette rotation signal when the cassette rotation signal is entered therein and for controlling the cassette rotating means in accordance with the cassette rotation signal stored in the memory means, when a cassette rotation permission signal for permitting the rotation of the rotatable cassette is generated, so that the rotatable cassette is set in a predetermined feeding station.

In the above arrangement, even if a cassette rotation signal is entered a plural number of times before the generation of the cassette rotation permission signals, the rotatable cassette is not rotated at each time. This prevents the useless rotation of the rotatable cassette caused by erroneous operation by the operator etc., reducing noise and ensuring extended service life of the rotation mechanism.

Another image forming apparatus according to the present invention which comprises rotatable cassettes rotated by cassette rotating means between a longitudinal feeding station from which paper is fed in a longitudinal direction thereof and a lateral feeding station from which paper is fed in a lateral direction thereof, and is designed such that image formation starts when image formation start instructing means is operated, is characterized by: (a) memory means for storing a cassette rotation signal for instructing to rotate the rotatable cassette; (b) control means for permitting the memory means to store the cassette rotation signal entered therein and for controlling the cassette rotating means in accordance with the cassette rotation signal stored in the memory means when the image formation start instructing means is operated so that the rotatable cassette is set in a predetermined feeding station.

In the above arrangement, even if a cassette rotation signal is entered a plural number of times before the actuation of an image formation start key which is the final operation for starting image formation, the rotatable cassette is not rotated at each time. This prevents the useless rotation of the rotatable cassette caused by erroneous operation by the operator etc., reducing noise and ensuring extended service life of the rotation mechanism.

Another image forming apparatus according to the present invention which comprises rotatable cassettes rotated by cassette rotating means between a longitudinal feeding station from which paper is fed in a longitudinal direction thereof and a lateral feeding station from which paper is fed in a lateral direction thereof is characterized by: (a) memory means for storing a cassette rotation signal for instructing to rotate the rotatable cassette; (b) timing means for timing a predetermined period; (c) control means for permitting the memory means to store the cassette rotation signal and the timing means to start its timing operation when the cassette rotation signal is entered therein, and for controlling the cassette rotating means in accordance with the cassette rotation signal stored in the memory means when there is no change in the cassette rotation signal stored in the memory means until the completion of the timing operation by the timing means, so that the rotatable cassette is set in a predetermined feeding station.

In the above arrangement, even if there is a change in the cassette rotation signal due to erroneous operation by the operator etc. before the completion of the timing operation by the timing means, the rotatable cassette is not rotated at each time. This prevents the useless rotation of the rotatable cassette, reducing noise and ensuring extended service life of the rotation mechanism.

Still another image forming apparatus according to the present invention which comprises rotatable cassettes rotated by cassette rotating means between a longitudinal feeding station from which paper is fed in a longitudinal direction thereof and a lateral feeding station from which paper is fed in a lateral direction thereof, and is designed such that image formation is started by the operation of image formation start instructing means, is characterized by: (a) image formation completion detecting means for detecting the completion of image formation; (b) memory means for storing a cassette rotation signal for instructing to rotate the rotatable cassette; (c) control means for permitting the memory means to store the cassette rotation signal entered therein and for controlling the cassette rotating means in accordance with the cassette rotation signal stored in the memory means when the completion of image formation is detected by the image formation completion detecting means after the operation of the image formation start instructing means, so that the rotatable cassette is set in a predetermined feeding station.

In the above arrangement, even if a cassette rotation signal is entered after the actuation of the image formation start instructing key until the detection of the completion of the image formation by the image formation completion detecting means, the rotatable cassette is not rotated, thereby preventing the occurrence of a paper jamming. This prevents the useless rotation of the rotatable cassette, reducing noise and ensuring extended service life of the rotation mechanism.

Yet another image forming apparatus according to the present invention which comprises rotatable cassettes rotated by cassette rotating means between a longitudinal feeding station from which paper is fed in a longitudinal direction thereof and a lateral feeding station from which paper is fed in a lateral direction thereof, and is designed such that paper is fed from the rotatable cassette by paper feeding means, is characterized by: (a) memory means for storing a cassette rotation signal for instructing to rotate the rotatable cassette; (b) control means for permitting the memory means to store the cassette rotation signal entered therein and for controlling the cassette rotating means in accordance with the cassette rotation signal stored in the memory means when a paper feed completion signal for indicating the completion of the operation of the paper feeding means is generated after the generation of a paper feed start signal for indicating the start of the operation of the paper feeding means so that the rotatable cassette is set in a predetermined feeding station.

In the above arrangement, even if a cassette rotation signal is entered after the generation of the paper feed start signal until the generation of the paper feed completion signal, the rotatable cassette is not rotated, thereby preventing the occurrence of a paper jamming. This prevents the useless rotation of the rotatable cassette, reducing noise and ensuring extended service life of the rotation mechanism.

Yet another image forming apparatus according to the present invention which comprises rotatable cassettes rotated by cassette rotating means between a longitudinal feeding station from which paper is fed in a longitudinal direction thereof and a lateral feeding station from which paper is fed in a lateral direction thereof, is characterized by: (a) feeding station detecting means for detecting whether the rotatable cassette is positioned in the longitudinal feeding station or the lateral feeding station; (b) control means for controlling the cassette rotating means so as to rotate the rotatable cassette to a predetermined feeding station when a cassette rotation signal for instructing to rotate the rotatable cassette is generated, permitting memory means to store the feeding station in which the rotatable cassette has been set, and controlling the cassette rotating means to reset the rotatable cassette in the feeding station stored in the memory means if the feeding station detecting means detects that the rotatable cassette gets out of the feeding station stored in the memory means, when the cassette rotation signal is not generated.

In the above arrangement, in case the rotatable cassette gets out of both longitudinal and lateral feeding station at the time of supplying paper to the rotatable cassette and hence normal paper feed can not be continued, image formation can be smoothly performed without the operator's instruction to rotate the rotatable cassette since the rotatable cassette is rotated to the most lately selected feeding station which is stored by the memory means.

Yet another image forming apparatus according to the present invention which comprises (a) a plurality of cassettes including rotatable cassettes rotated by cassette rotating means between a longitudinal feeding station from which paper is fed in a longitudinal direction thereof and a lateral feeding station from which paper is fed in a lateral direction thereof; (b) image formation start instructing means for instructing to start image formation; (c) cassette display means for displaying a selected cassette; and (d) paper display means for displaying the size and feeding direction of paper stored in a selected cassette, and indicating the longitudinal feeding and lateral feeding as to paper stored in a selected rotatable cassette, is characterized by: (1) cassette changeover instructing means for instructing to change the cassette; (2) memory means for storing the feeding direction of the paper displayed by the paper display means; (3) feeding station detecting means for detecting whether the rotatable cassette is set in the longitudinal feeding station or the lateral feeding station; and (4) control means for successively switching the cassette display means and paper display means which correspond to each cassette when the cassette changeover instructing means is operated, permitting the memory means to store the feeding direction of the paper displayed by the paper display means which has been selected by the above changeover operation, and controlling the cassette rotating means such that the feeding station corresponding to the paper feeding direction stored in the memory means when the rotatable cassette is selected by the cassette changeover instructing means and the image formation start instructing means is operated, is made coincident with the feeding station in which the rotatable cassette is positioned detected by the feeding station detecting means, when those feeding stations are different from each other.

In the above arrangement, the selection of a cassette and the instruction to rotate the rotatable cassette can be performed by the same cassette changeover instructing means, thereby reducing the number of parts in the image forming apparatus. Further, when the rotation of the rotatable cassette is required, the rotatable cassette is not rotated before the selection of a cassette or the instruction to rotate the rotatable cassette is determined, but performed only when the image formation start instructing means is operated. This prevents the useless rotation of the rotatable cassette.

Still another image forming apparatus according to the present invention which comprises rotatable cassettes rotated by cassette rotating means between a longitudinal feeding station from which paper is fed in a longitudinal direction thereof and a lateral feeding station from which paper is fed in a lateral direction thereof, the rotatable cassette being designed to be inserted and taken out in and from the image forming apparatus, when it is positioned in a predetermined feeding station, is characterized by: (a) feeding station detecting means for detecting whether the rotatable cassette is positioned in the longitudinal feeding station or the lateral feeding station when the image forming apparatus is switched ON and/or an image formation is completed; (b) control means for controlling the cassette rotating means so as to rotate the rotatable cassette to a feeding station set as a rotatable cassette taking-out-/insertion position, when the feeding station detected by the feeding station detecting means differs from the feeding station set as a rotatable cassette taking-out/insertion position.

In the above arrangement, when an image formation is completed or the image forming apparatus is switched ON, the rotatable cassette is set in a feeding station determined as a rotatable cassette taking-out/insertion position, so that the rotatable cassette is always in a position from which it can be taken out whenever supplying paper to the rotatable cassette.

The invention being thus described, it may be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An image forming apparatus comprising rotatable cassettes rotated by cassette rotating means between a longitudinal feeding station from which paper is fed in a longitudinal direction thereof and a lateral feeding station from which paper is fed in a lateral direction thereof, characterized by:

memory means for storing a cassette rotation signal for instructing to rotate the rotatable cassette; and control means for permitting the memory means to store the cassette rotation signal when the cassette rotation signal is entered therein and for controlling the cassette rotating means in accordance with the cassette rotation signal stored in the memory means, when a cassette rotation permission signal for permitting the rotation of the rotatable cassette is generated, so that the rotatable cassette is set in a predetermined feeding station.

2. An image forming apparatus according to claim 1, which is a copying machine or laser printer.

3. An image forming apparatus according to claim 1, wherein the cassette rotating means is a cassette rotating motor and the control means is a microcomputer.

4. An image forming apparatus according to claim 1, wherein the rotatable cassette is rotatably disposed within an outer box, and the outer box is designed to be taken out and inserted from and in the image forming apparatus.

5. An image forming apparatus comprising rotatable cassettes rotated by cassette rotating means between a longitudinal feeding station from which paper is fed in a longitudinal direction thereof and a lateral feeding station from which paper is fed in a lateral direction thereof, and image formation start instructing means for instructing to start an image formation, characterized by:

memory means for storing a cassette rotation signal for instructing to rotate the rotatable cassette; and control means for permitting the memory means to store the cassette rotation signal entered therein and for controlling the cassette rotating means in accordance with the cassette rotation signal stored in the memory means, when the image formation start instructing means is operated, so that the rotatable cassette is set in a predetermined feeding station.

6. An image forming apparatus according to claim 5, which is a copying machine or laser printer.

7. An image forming apparatus according to claim 5, wherein the cassette rotating means is a cassette rotating motor, the control means is a microcomputer and the image formation start instructing means is an image formation starting key.

8. An image forming apparatus according to claim 5, wherein the rotatable cassette is rotatably disposed in an outer box and the outer box is designed to be taken out and inserted from and in the image forming apparatus.

9. An image forming apparatus comprising rotatable cassettes rotated by cassette rotating means between a longitudinal feeding station from which paper is fed in a longitudinal direction thereof and a lateral feeding station from which paper is fed in a lateral direction thereof, characterized by:

memory means for storing a cassette rotation signal for instructing to rotate the rotatable cassette;

timing means for timing a predetermined period; and control means for permitting the memory means to store the cassette rotation signal and the timing means to start its timing operation when the cassette rotation signal is entered therein, and for controlling the cassette rotating means in accordance with the cassette rotation signal stored in the memory means, when there is no change in the cassette rotation signal stored in the memory means until the completion of the timing operation by the timing means, so that the rotatable cassette is set in a predetermined feeding station.

10. An image forming apparatus according to claim 9, which is a copying machine or laser printer.

11. An image forming apparatus according to claim 9, wherein the cassette rotating means is a cassette rotating motor and the control means is a microcomputer.

12. An image forming apparatus according to claim 9, wherein the rotatable cassette is rotatably disposed within an outer box and the outer box is designed to be taken out and inserted from and in the image forming apparatus.

13. An image forming apparatus comprising rotatable cassettes rotated by cassette rotating means between a longitudinal feeding station from which paper is fed in a longitudinal direction thereof and a lateral feeding station from which paper is fed in a lateral direction thereof, and image formation start instructing means for instructing to start an image formation, is characterized by:

image formation completion detecting means for detecting the completion of an image formation;

memory means for storing a cassette rotation signal for instructing to rotate the rotatable cassette; and control means for permitting the memory means to store the cassette rotation signal entered and for controlling the cassette rotating means in accordance with the cassette rotation signal stored in the memory means, upon detection of the completion of an image formation by the image formation completion detecting means after the image formation start instructing means is operated, so that the rotatable cassette is set in a predetermined feeding station.

14. An image forming apparatus according to claim 13, which is a copying machine or laser printer.

15. An image forming apparatus according to claim 13, wherein the image formation start instructing means is an image formation starting key, the cassette rotating means is a cassette rotating motor, the control means is a microcomputer, and the image formation completion detecting means is a paper discharge detection switch for detecting the discharge of a paper onto a paper receiving unit.

16. An image forming apparatus according to claim 13, wherein the rotatable cassete is rotatably disposed within an outer box and the outer box is designed to be taken out and inserted from and in the image forming apparatus.

17. An image forming apparatus which comprises rotatable cassettes rotated by cassette rotating means between a longitudinal feeding station from which paper is fed in a longitudinal direction thereof and a lateral feeding station from which paper is fed in a lateral direction thereof, and is designed to feed paper from the rotatable cassette by paper feeding means, characterized by:

memory means for storing a cassette rotation signal for instructing to rotate the rotatable cassette; and control means for permitting the memory means to store the cassette rotation signal entered and for controlling the cassette rotating means in accordance with the cassette rotation signal stored in the memory means, when a paper feed completion signal for indicating the completion of the operation of the paper feeding means is generated after the generation of the paper feed start signal for indicating the start of the operation of the paper feeding means, so that the rotatable cassette is set in a predetermined feeding station.

18. An image forming apparatus according to claim 17, which is a copying machine or laser printer.

19. An image forming apparatus according to claim 17, wherein the cassette rotating means is a cassette rotating motor, the control means is a microcomputer, and the paper feeding means is a paper feeding roller.

20. An image forming apparatus according to claim 17, wherein the rotatable cassette is rotatably disposed within an outer box and the outer box is designed to be taken out and inserted from an in the image forming apparatus.

21. An image forming apparatus which comprises rotatable cassettes rotated by cassette rotating means between a longitudinal feeding station from which paper is fed in a longitudinal direction thereof and a lateral feeding station from which paper is fed in a lateral direction thereof, characterized by:

feeding station detecting means for detecting whether the rotatable cassette is positioned in the longitudinal feeding station or the lateral feeding station; and control means for controlling the cassette rotating means so as to rotate the rotatable cassette to a predetermined feeding station when a cassette rotation signal for instructing to rotate the rotatable cassette is generated, permitting memory means to store the predetermined feeding station to which the rotatable cassette has been rotated, and controlling the cassette rotating means, if the feeding station detecting means detects that the rotatable cassette gets out of the predetermined feeding station when the cassette rotation signal is not generated, so that the rotatable cassette is reset in the feeding station stored in the memory means.

22. An image forming apparatus according to claim 21, which is a copying machine or laser printer.

23. An image forming apparatus according to claim 21, wherein the cassette rotating means is a cassette rotating motor, the control means is a microcomputer, and the feeding station detecting means comprises a sensor for detecting that the rotatable cassette is positioned in the longitudinal feeding station and a sensor for detecting that the rotatable cassette is positioned in the lateral feeding station.

24. An image forming apparatus according to claim 21, wherein the rotatable cassette is rotatably disposed in an outer box and the outer box is designed to be taken out and inserted from and in the image forming apparatus.

25. An image forming apparatus which comprises (a) a plurality of cassettes including rotatable cassettes rotated by cassette rotating means between a longitudinal feeding station from which paper is fed in a longitudinal direction thereof and a lateral feeding station from which paper is fed in a lateral direction thereof; (b) image formation start instructing means for instructing to start an image formation; (c) cassette display means for displaying a selected cassette; and (d) paper display means for displaying the size and feeding direction of paper stored in a selected cassette, and indicating the longitudinal feeding or lateral feeding as to paper stored in a selected rotatable cassette, is characterized by:

cassette changeover instructing means for instructing to change a cassette;

memory means for storing the feeding direction of the paper displayed by the paper display means;

feeding station detecting means for detecting whether the rotatable cassette is set in the longitudinal feeding station or the lateral feeding station; and control means for successively switching the cassette display means and the paper display means which correspond to each cassette when the cassette changeover instructing means is operated, permitting the memory means to store the feeding direction of the paper displayed by the paper display means which has been selected by the above changeover operation, and controlling the cassette rotating means such that the feeding station corresponding to the paper feeding direction stored in the memory means when a rotatable cassette is selected by the cassette changeover instructing means and the image formation start instructing means is operated, is made coincident with the feeding station in which the rotatable cassette is positioned detected by the feeding station detecting means, when those feeding stations are different from each other.

26. An image forming apparatus according to claim 25, which is a copying machine or laser printer.

27. An image forming apparatus according to claim 25, wherein the cassette rotating means is a cassette rotating motor; the control means is a microcomputer; the image formation start instructing means is an image formation start key; the cassette display means is cassette display lamps; the paper display means is paper size display lamps; and the feeding station detecting means comprises a sensor for detecting that the rotatable cassette is positioned in the longitudinal feeding station and a sensor for detecting that the rotatable cassette is positioned in the lateral feeding station.

28. An image forming apparatus according to claim 25 further comprising a plurality of rotatable cassettes for respectively storing A4 size paper and B5 size paper, and a plurality of fixed cassettes for respectively storing B4 size paper and A3 size paper, and a manual paper feeder.

29. An image forming apparatus according to claim 27, wherein the paper size display lamps respectively correspond to A3 size, B4 size, A4 size, A4R size, B5 size, and B5R size.

30. An image forming apparatus according to claim 25, wherein the rotatable cassette is rotatably disposed in an outer box and the outer box is designed to be taken out and inserted from and in the image forming apparatus.

31. An image forming apparatus which comprises rotatable cassettes rotated by cassette rotating means between a longitudinal feeding station from which paper is fed in a longitudinal direction thereof and a lateral feeding station from which paper is fed in a lateral direction thereof, the rotatable cassette being designed to be taken out and inserted from and in the image forming apparatus when it is positioned in a predetermined feeding station, characterized by:

feeding station detecting means for detecting whether the rotatable cassette is positioned in the longitudinal feeding station or the lateral feeding station when the image forming apparatus is switched ON and/or an image formation is completed; and control means for controlling the cassette rotating means to rotate the rotatable cassette to the feeding station predetermined as a rotatable cassette taking-out/insertion position when the feeding station detected by the feeding station detecting means differs from the feeding station predetermined as a rotatable cassette taking-out/insertion position.

32. An image forming apparatus according to claim 31, which is a copying machine or laser printer.

33. An image forming apparatus according to claim 31, wherein the cassette rotating means is a cassette rotating motor, the control means is a microcomputer, the feeding station detecting means comprises a sensor for detecting that the rotatable cassette is positioned in the longitudinal feeding station and a sensor for detecting that the rotatable cassette is positioned in the lateral feeding station.

34. An image forming apparatus according to claim 31, wherein the rotatable cassette is taken out and inserted from and in the image forming apparatus when it is positioned in the lateral feeding station.

* * * * *